US008612609B2

(12) United States Patent
Mang et al.

(10) Patent No.: US 8,612,609 B2
(45) Date of Patent: Dec. 17, 2013

(54) METHODS AND APPARATUS TO REASSIGN QUALITY OF SERVICE PRIORITIES IN A COMMUNICATION NETWORK

(75) Inventors: Xiaowen Mang, Morganville, NJ (US); Carolyn Roche Johnson, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 700 days.

(21) Appl. No.: 12/550,750

(22) Filed: Aug. 31, 2009

(65) Prior Publication Data

US 2011/0051731 A1 Mar. 3, 2011

(51) Int. Cl.
*G06F 15/16* (2006.01)
(52) U.S. Cl.
USPC ............ 709/228; 709/226; 709/229; 370/401
(58) Field of Classification Search
USPC .......................... 709/226, 228–229; 370/401
See application file for complete search history.

(56) References Cited

U.S. PATENT DOCUMENTS

| | | | |
|---|---|---|---|
| 6,148,337 A * | 11/2000 | Estberg et al. ............... | 709/224 |
| 6,226,277 B1 * | 5/2001 | Chuah .......................... | 370/328 |
| 6,683,853 B1 | 1/2004 | Kannas et al. | |
| 6,970,423 B2 | 11/2005 | Chuah | |
| 7,290,028 B2 | 10/2007 | Brabson et al. | |
| 2002/0152319 A1 * | 10/2002 | Amin et al. ................... | 709/232 |
| 2005/0064821 A1 * | 3/2005 | Hedberg et al. ............ | 455/67.11 |
| 2005/0128963 A1 | 6/2005 | Gazda et al. | |
| 2007/0002765 A1 * | 1/2007 | Kadaba et al. ............... | 370/254 |
| 2008/0132269 A1 * | 6/2008 | Shen et al. ................... | 455/550.1 |
| 2008/0175255 A1 * | 7/2008 | Krstulich et al. ............ | 370/401 |
| 2009/0010156 A1 | 1/2009 | Song et al. | |
| 2009/0077256 A1 | 3/2009 | Madan | |
| 2009/0138596 A1 | 5/2009 | Song | |
| 2009/0178058 A1 * | 7/2009 | Stillwell et al. .............. | 719/317 |
| 2011/0113480 A1 * | 5/2011 | Ma et al. ...................... | 726/9 |
| 2011/0208853 A1 * | 8/2011 | Castro-Castro et al. ..... | 709/223 |
| 2012/0059943 A1 * | 3/2012 | Castro Castro et al. ..... | 709/227 |

* cited by examiner

*Primary Examiner* — Duyen Doan
(74) *Attorney, Agent, or Firm* — Hanley, Flight & Zimmerman, LLC

(57) ABSTRACT

Methods and apparatus to reassign quality of service (QoS) priorities in a communication network are disclosed. An example method disclosed herein comprises performing a temporary QoS priority reassignment for network traffic between a first network element associated with a first user of a communication network and a second network element associated with a second user of the communication network without intervention by a service provider providing the communication network to the first and second users, the first user authorized by the service provider to temporarily reassign a QoS priority associated with the second user, and terminating the temporary QoS priority reassignment based on a monitored termination criteria.

21 Claims, 15 Drawing Sheets

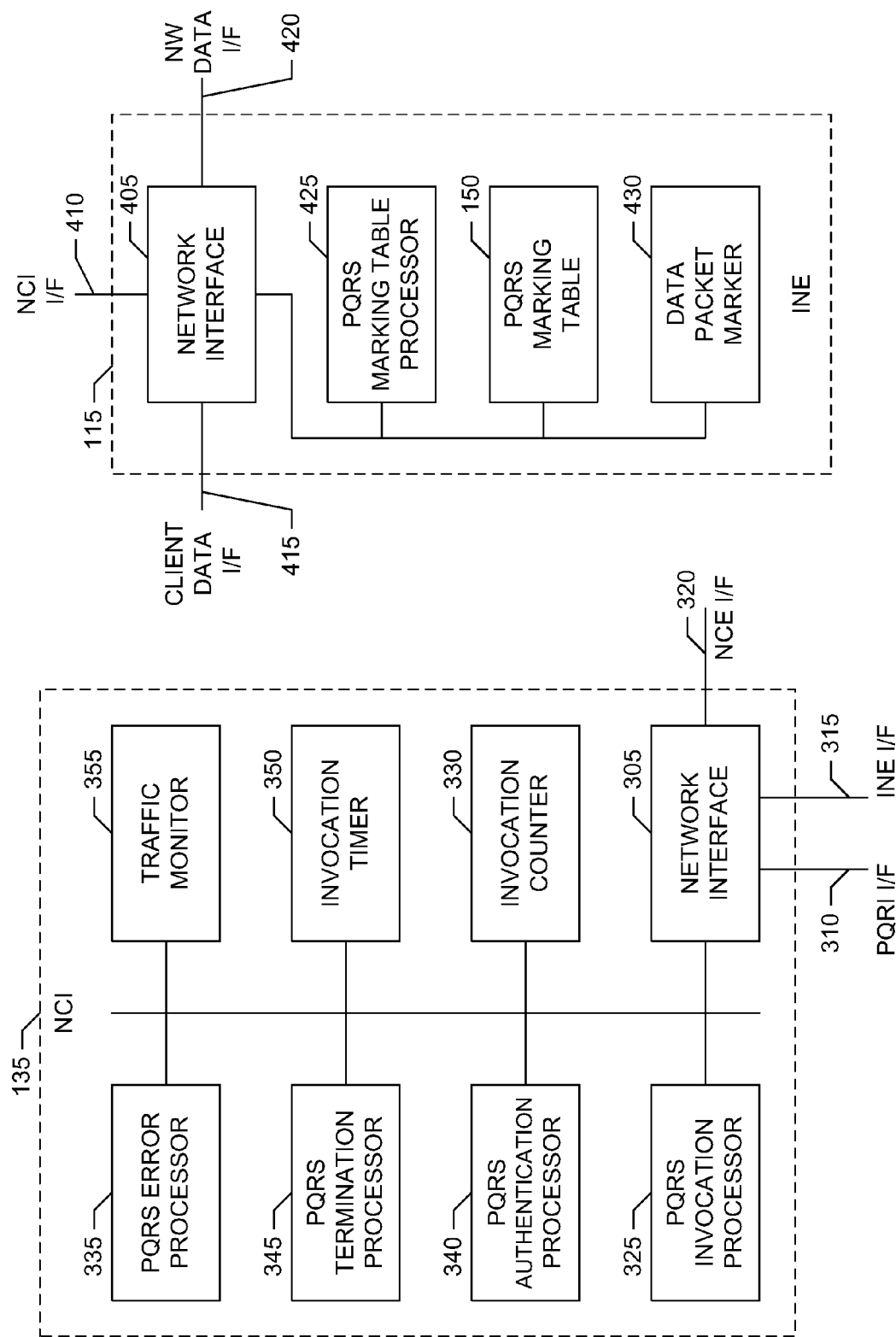

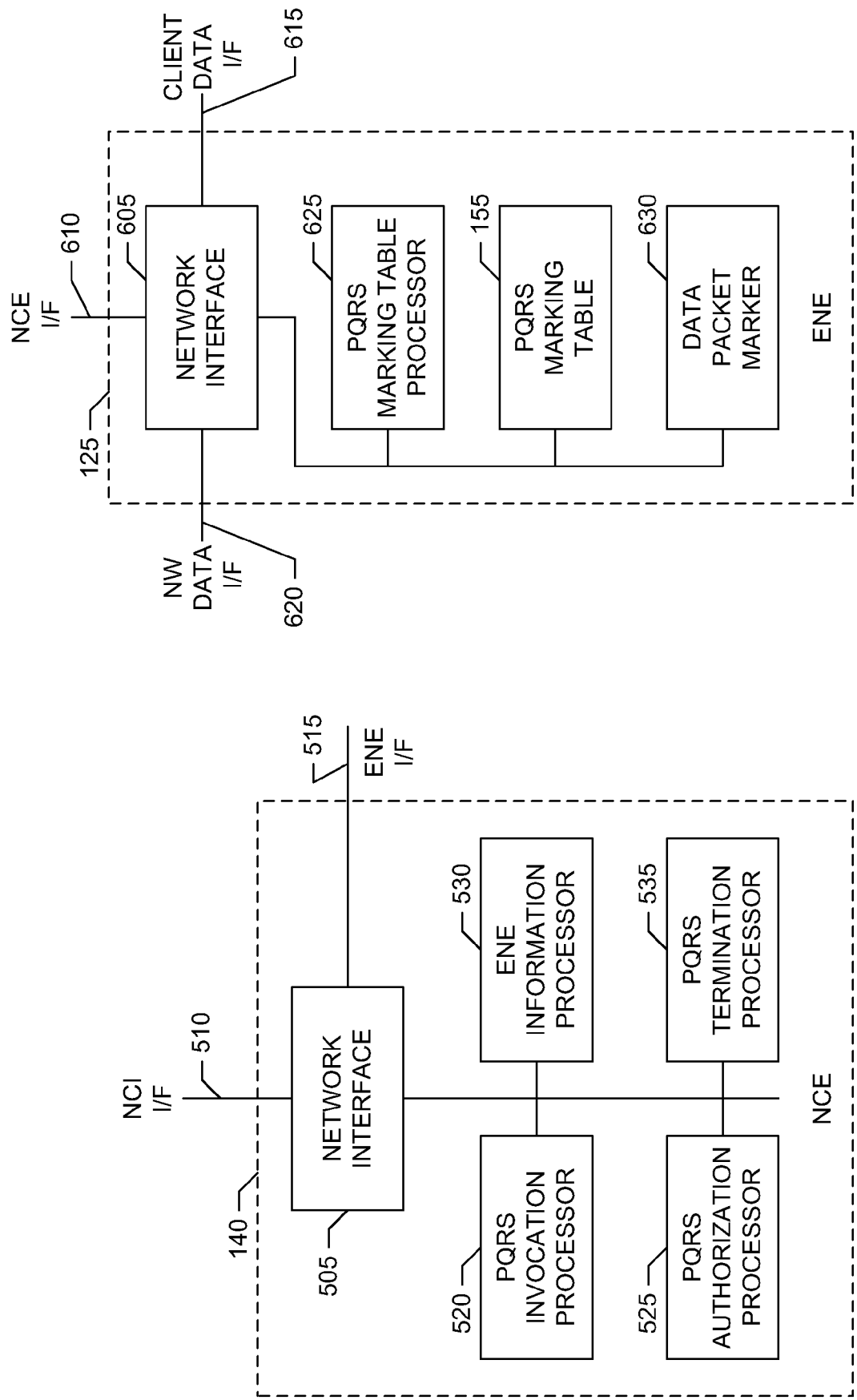

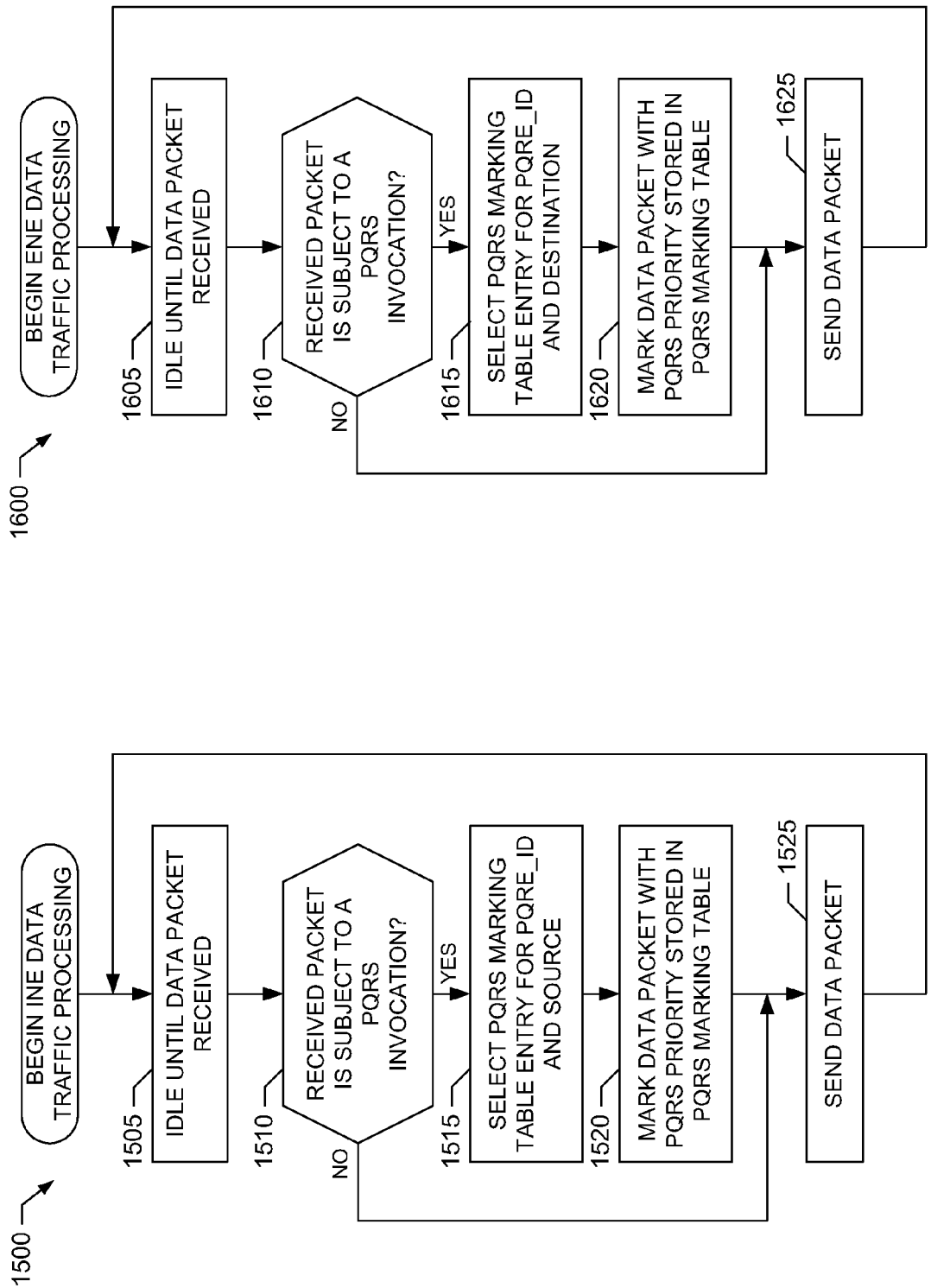

METHODS AND APPARATUS TO REASSIGN QUALITY OF SERVICE PRIORITIES IN A COMMUNICATION NETWORK

FIELD OF THE DISCLOSURE

This disclosure relates generally to communication networks and, more particularly, to methods and apparatus to reassign quality of service priorities in a communication network.

BACKGROUND

Internet protocol (IP) and other types of data communication networks typically employ quality of service (QoS) priorities (also referred to as QoS levels) to represent desired performance targets, such as desired error rates, latencies, jitter, etc., for different types of traffic carried by the network. Generally, higher QoS priorities identify network traffic having more stringent performance targets and, therefore, requiring more communication resources, whereas lower QoS priorities identify network traffic having less stringent performance targets and, therefore, requiring fewer communication resources. Conventionally, a communication network service provider employs a service provisioning system to negotiate or offer a particular service level agreement to a particular network user specifying certain QoS priorities for different types of network traffic exchanged by the network user. For example, a service level agreement may specify a service profile containing respective QoS priorities for best effort traffic, streaming data traffic, voice and multimedia traffic, etc. Furthermore, different network users may have service level agreements specifying different service profiles and associated QoS priorities.

BRIEF DESCRIPTION OF THE DRAWINGS

FIG. 3 is a block diagram of a first example network control element that may be used to implement the first and/or second example communication networks of FIGS. 1-2.

FIG. 4 is a block diagram of a first example network access element that may be used to implement the first and/or second example communication networks of FIGS. 1-2.

FIG. 5 is a block diagram of a second example network control element that may be used to implement the first and/or second example communication networks of FIGS. 1-2.

FIG. 6 is a block diagram of a second example network access element that may be used to implement the first and/or second example communication networks of FIGS. 1-2.

FIG. 15 is a flowchart representative of example machine readable instructions that may be executed to implement data traffic processing in the first example network access element of FIG. 4.

FIG. 16 is a flowchart representative of example machine readable instructions that may be executed to implement data traffic processing in the second example network access element of FIG. 6.

DETAILED DESCRIPTION

Figure 1:
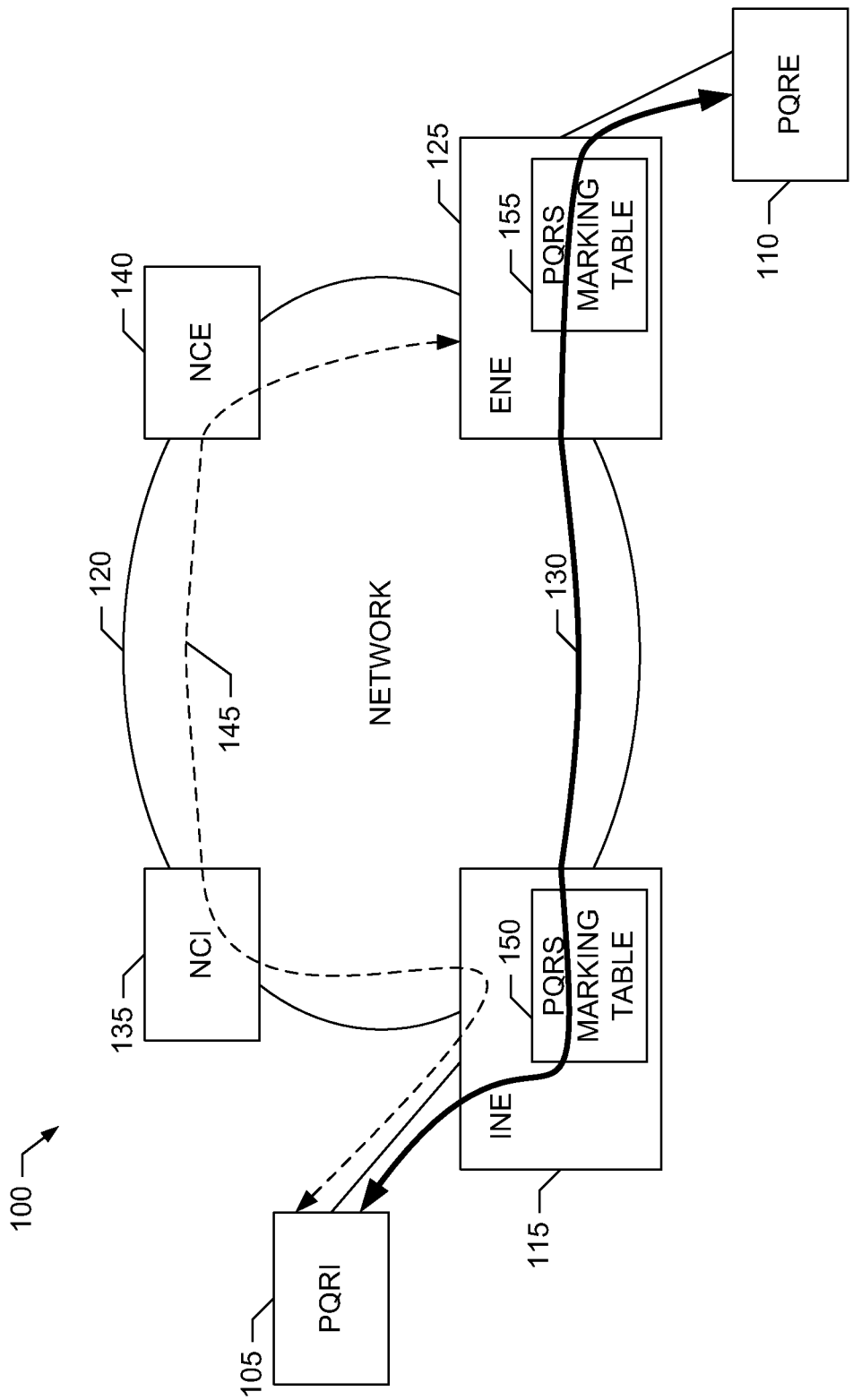
FIG. 1 is a block diagram of a first example communication network supporting quality of service (QoS) priority reassignment according to the methods and apparatus described herein.

Methods and apparatus to reassign quality of service (QoS) priorities in a communication network are disclosed. An example QoS priority reassignment technique described herein involves performing a temporary QoS priority reassignment for network traffic between a first network element associated with a first user of the communication network and a second network element associated with a second user of the communication network. Additionally, such temporary QoS priority reassignment is performed without intervention by a service provider providing the communication network to the first and second users. Instead, the first user is authorized by the service provider to temporarily reassign a QoS priority associated with the second user. Furthermore, the example QoS reassignment technique involves terminating the temporary QoS priority reassignment based on one or more termination criteria when needed. Also, in some example implementations, the first user is authorized to only upgrade or promote the QoS priority associated with the second user to thereby avoid unintended service degradation.

In many conventional communication networks, the QoS priorities associated with a particular network user (e.g., such as the QoS priorities specified by the particular network user's service profile) are static. In such conventional networks, changing the QoS priorities associated with a particular network user's service profile requires the network user to renegotiate or resubscribe to a different service level agreement or a different service profile through the service provider's service provisioning system. Unlike such conventional techniques, the example QoS priority reassignment techniques described herein allow dynamic (e.g., on-demand), temporary reassignment of a QoS priority associated with a network user. Additionally, unlike conventional systems in which only the service provider can reassign static QoS priorities through its service provisioning system, the QoS priority reassignment techniques described herein are invoked for a particular network user by another authorized network user instead of by the service provider.

For example, through the QoS priority reassignment techniques described herein, a service retailer or content provider that is an authorized user of the service provider's communication network can perform an on-demand, temporary upgrade of the QoS priority of another user's network traffic to and/or from the service retailer or content provider. As another example, through the QoS priority reassignment techniques described herein, a government entity authorized by the service provider can perform an on-demand, temporary upgrade of the QoS priority of a first responder's network traffic to and/or from the government entity during an emergency situation. Furthermore, in these examples, QoS priority reassignment is able to be performed by an authorized network user without intervention by the service provider.

Such on-demand, temporary QoS priority reassignment can achieve many benefits over conventional techniques. For example, by becoming authorized to perform on-demand, temporary QoS priority upgrades for its customers, a service retailer or content provider can differentiate itself from competitors by offering services and/or applications having improved QoS performance and quality relative to the competitors' services and applications, even though the customers have subscribed to network service having lower QoS priorities (e.g., such as a best effort service). Because such differentiation may be attractive to many service retailers and content providers, the service provider can improve its revenue stream by offering premium service classes authorizing a premium user (such as a subscribing service retailer or content provider) to perform on-demand, temporary QoS priority reassignment (e.g., upgrading) of the network traffic exchanged with its customers. A further benefit of the QoS priority reassignment techniques described herein is the ability of a government agency to rapidly perform an on-demand, temporary upgrade of the QoS priority of a first responder's network traffic to and/or from the government agency without requiring intervention by the service provider. In this way, the first responder's network traffic can be given higher priority in the communication network almost immediately at the onset of an emergency situation.

Turning to the figures, a first example communication network 100 supporting the QoS priority reassignment techniques described herein is illustrated in FIG. 1. In the example communication network 100, a first user can become authorized to temporarily reassign QoS priorities of other network users exchanging network traffic with the first user. To become so authorized, the first user subscribes to a particular service offered by the service provider that enables the first user to perform temporary QoS priority reassignments. Such a service is referred to herein by way of example and without limitation as a priority QoS reassignment service (PQRS). As described in greater detail below, the PQRS specifies one or more invocation criteria governing when the authorized first user can invoke the PQRS to temporarily reassign a QoS priority of another user. The PQRS also specifies one or more termination criteria governing when a temporary QoS priority reassignment is to be terminated. For convenience, and without limitation, a user who is authorized to initiate a QoS priority reassignment of another user is referred to herein as a priority QoS reassignment initiator (PQRI), and a user whose QoS priority is to be reassigned by the PQRI is referred to herein as a priority QoS reassignment end-user (PQRE).

In the illustrated example of FIG. 1, the communication network 100 includes a PQRI device 105 that is to exchange network traffic with a PQRE device 110. The PQRI device 105 and PQRE device 110 can each correspond to any type of network element, device, appliance, etc., capable of exchanging data traffic, such as a server, personal computer (PC), laptop, mobile phone, personal digital assistant (PDA), etc. The communication network 100 also includes a first network access element 115, also referred to herein as the initiating network access element (INE) 115, communicatively coupled with the PQRI device 105 to provide access to a network 120 (e.g., such as a core network 120) comprising any appropriate networking technology. Similarly, the communication network 100 further includes a second network access element 125, also referred to herein as the end-user network access element (ENE) 125, communicatively coupled with the PQRE device 110 to provide access to the network 120. The INE 115 and ENE 125 can each correspond to any type of network access element, such as a modem, router, gateway, bridge, etc. Furthermore, the PQRI device 105 and the INE 115 could be implemented as one device or as separate devices directly connected to each other or indirectly connected via one or more communication networks. Likewise, the PQRE device 110 and the ENE 125 could be implemented as one device or as separate devices directly connected to each other or indirectly connected via one or more communication networks. As such, the PQRI device 105 and the INE 115 could be co-located or could reside at different locations. Similarly, the PQRE device 110 and the ENE 125 could be co-located or could reside at different locations.

The INE 115, network 120 and ENE 125 implement a data traffic path 130 (also referred to as a media path 130) between the PQRI device 105 and PQRE device 110 via which network traffic can be exchanged. The exchanged network traffic can correspond to any type of service or application, such as file downloading or uploading, streaming media, video-on-demand (VOD), voice over Internet protocol (VoIP), etc. Under normal operating conditions, the network traffic exchanged between the PQRI device 105 and the PQRE device 110 has a default QoS priority determined by the class of network service to which the PQRE has subscribed. For example, the PQRE can subscribe to a best effort service in which network traffic exchanged with the PQRE device 110 is marked with a low QoS priority corresponding to the best effort service. However, using the methods and apparatus described herein, the PQRI can invoke the PQRS and temporarily reassign (e.g., upgrade) the QoS priority of network traffic between the PQRI device 105 and PQRE device 110 even though the PQRE has only subscribed to a lower service class. As a shorthand convenience, performing a temporary QoS priority reassignment for the PQRE (and, in particular, the PQRE device 110) is also referred to herein as invoking the PQRS for the PQRE.

To implement temporary QoS priority reassignment according to the methods and apparatus described herein, the communication network 100 of the illustrated example includes first and second example network control elements 135 and 140. The first network control element is also referred to herein as the network control initiating element (NCI) 135, and the second network control element 140 is also referred to herein as the network control end-user element (NCE) 140.

The NCI 135 and NCE 140 can each be implemented by any type of network control element, such as a network switch, router, bridge, gateway, etc. The NCI 135, network 120 and NCE 140 implement a PQRS control path 145 between the INE 115 serving PQRI device 105 and the ENE 125 serving the PQRE device 110. In the example of FIG. 1, the NCI 135 and the NCE 140 are not included in the data path 130, and the PQRS control path 145 is separate from the data path 130. Because the amount of PQRS signaling is relatively small compared to other network traffic, the introduction of the NCI 135, the NCE 140 and the resulting PQRS control path 145 will not appreciably degrade the performance of existing applications utilizing the service provider's network, including the performance of the network data path 130.

As mentioned above, the PQRI subscribes to a PQRS that authorizes the PQRI to reassign (e.g., upgrade or promote) the QoS priority of the PQRE and, in particular, some or all of the network traffic between the PQRE device 110 and the PQRI device 105. The PQRS specifies one or more invocation criteria governing when the PQRI can perform an on-demand, temporary QoS priority reassignment the PQRE. Examples of such invocation criteria include an invocation frequency limiting a total number of temporary QoS priority reassignments allowed to be performed by the PQRI during a specified interval of time, a concurrent invocation limit limiting a total number of temporary QoS priority reassignments allowed to be active at any given time, etc. The invocation criteria allow the service provider to predict overall network traffic and appropriately size the capacity of the example communication network 100.

The PQRS also specifies one or more termination criteria governing when a temporary QoS priority reassignment of the PQRE invoked by the PQRI is to be terminated. Examples of such termination criteria are a specified invocation period during which a temporary QoS priority reassignment of the PQRE is allowed to be active, a specified total amount of network traffic allowed to be exchanged during the temporary QoS priority reassignment of the PQRE, etc. The termination criteria allow the service provider to develop any number of PQRS plans or tiers (e.g., such as plans/tiers offering shorter or longer invocation periods and/or more or less total amounts of data) having different prices, thereby allowing a PQRI to select a particular PQRS plan/tier that meets its requirements and competitive goals. Furthermore, a particular PQRI can subscribe to multiple PQRS plans/tiers, and invoke the particular PQRS plan/tier that is suited to a particular PQRE and the particular service/application being offered to the PQRE.

In at least some example implementations, the service provider charges the PQRI for any PQRS plan(s)/tier(s) to which it subscribes, with the service provider not charging the PQRE for any temporary QoS priority reassignments. In other words, the PQRE can accesses the communication network 100 under its standard service agreement with the service provider, and can receive temporary QoS priority reassignments from the PQRI without further charges from the service provider. However, the PQRI could negotiate a separate agreement with the PQRE through which the PQRE pays a certain premium to access services and/or applications offered by the PQRI at a higher QoS priority.

To illustrate an example operation of the PQRS in the communication network 100, assume that the PQRI is a multimedia service retailer, also referred to as a multimedia service distributor, subscribing to the communication network 100 to offer one or more multimedia services to customers, such as the PQRE. In such an example, the PQRE uses the PQRE device 110 to access the PQRI device 105 and obtain the multimedia service (e.g., such as an online interactive gaming environment) offered by the PQRI. For example, assume the PQRE has subscribed to a standard service, such as a best effort service, in which network traffic exchanged with the PQRE device 110 is marked with a low QoS priority (e.g., the priority corresponding to the best effort service). However, because it subscribes to the PQRS, the PQRI can reassign (e.g., upgrade or promote) the QoS priority of the PQRE and, in particular, the QoS priority of the network traffic exchanged between the PQRE device 110 and the PQRI device 105 via the data traffic path 130. In this way, the PQRE can obtain the multimedia service (e.g., such as an online interactive gaming environment) offered by the PQRI at the higher QoS offered by the PQRS without needing to renegotiate with the service subscriber to change its service profile or service level agreement for accessing the communication network 100.

For example, after subscribing to the PQRS, the PQRI can use the PQRI device 105 to initiate a temporary QoS priority reassignment of the PQRE using the PQRS. This initiation is communicated to the NCI 135, which evaluates the invocation criteria specified by the PQRS to determine whether the temporary QoS priority reassignment can be invoked. Assuming the invocation criteria are satisfied, the NCI 135 causes the INE 115 to create an entry in a PQRS marking table 150 maintained by the INE 115 to store the reassigned (e.g., upgraded or promoted) QoS priority to be used to mark network traffic sent by the PQRI device 105 to the PQRE device 110. Additionally, the NCI 135 signals the NCE 140 that a temporary QoS priority reassignment is to be invoked for the PQRE device 110 served by the NCE 140.

In response, the NCE 140 evaluates one or more authorization criteria to determine whether to accept or reject the temporary QoS priority reassignment being invoked by the NCI 135. An example of such authorization criteria includes a QoS improvement requirement that an upgraded QoS priority resulting from a temporary QoS priority reassignment must be an improvement over an existing QoS priority to which the PQRE has subscribed. Another example of such authorization criteria is a subscription rule requirement that a temporary QoS priority reassignment cannot be performed if prohibited by a service profile or service level agreement governing the PQRE's access to the communication network 100, etc. Assuming any authorization criteria are satisfied, the NCE 140 signals to the NCI 135 that invocation of the temporary QoS priority reassignment is allowed. Additionally, the NCE 140 causes the ENE 125 to create an entry in a PQRS marking table 155 maintained by the ENE 125 to store the reassigned (e.g., upgraded or promoted) QoS priority to be used to mark network traffic sent by the PQRE device 110 to the PQRI device 105.

Once the appropriate entries in the PQRS marking tables 150 and 155 are created, network traffic can be exchanged between the PQRE device 110 and the PQRI device 105 using the appropriate reassigned (e.g., upgraded or promoted) QoS priority or priorities stored in the respective PQRS marking tables 150 and 155. For example, different QoS priorities can be assigned based on the direction of the network traffic, the type of network traffic, etc. Each of these QoS priorities can be stored in the appropriate PQRS marking tables 150 and 155 and accessed to mark network traffic between the PQRE device 110 and the PQRI device 105 over the data traffic path 130 in the communication network 100.

Then, after invoking the temporary QoS priority reassignment for traffic between the PQRE device 110 and the PQRI device 105, the NCI 135 evaluates the termination criteria specified by the PQRS to determine when to terminate the temporary QoS priority reassignment. When one or more of the termination criteria is satisfied, the NCI 135 signals the INE 115 and ENE 125 (the latter via the NCE 140) to terminate the temporary QoS priority reassignment. In response, the INE 115 and the ENE 125 each clear the entries in the respective PQRS marking tables 150 and 155 associated with this temporary QoS priority reassignment. However, even though the temporary QoS priority reassignment is terminated, the PQRE device 110 and the PQRI device 105 can continue exchanging network traffic over the data traffic path 130, but at the standard QoS priority associated with the PQRE device 110. After the temporary QoS priority reassignment invoked using the PQRS is terminated, the service provider determines any appropriate billing information needed to charge the PQRI and/or the PQRE for use of the PQRS. As described above, the service provider may or mat not charge the PQRE for benefiting from the PQRS. Additionally or alternatively, the PQRI may determine any appropriate billing information to charge the PQRE depending upon an agreement between the PQRE and PQRI.

Figure 2:
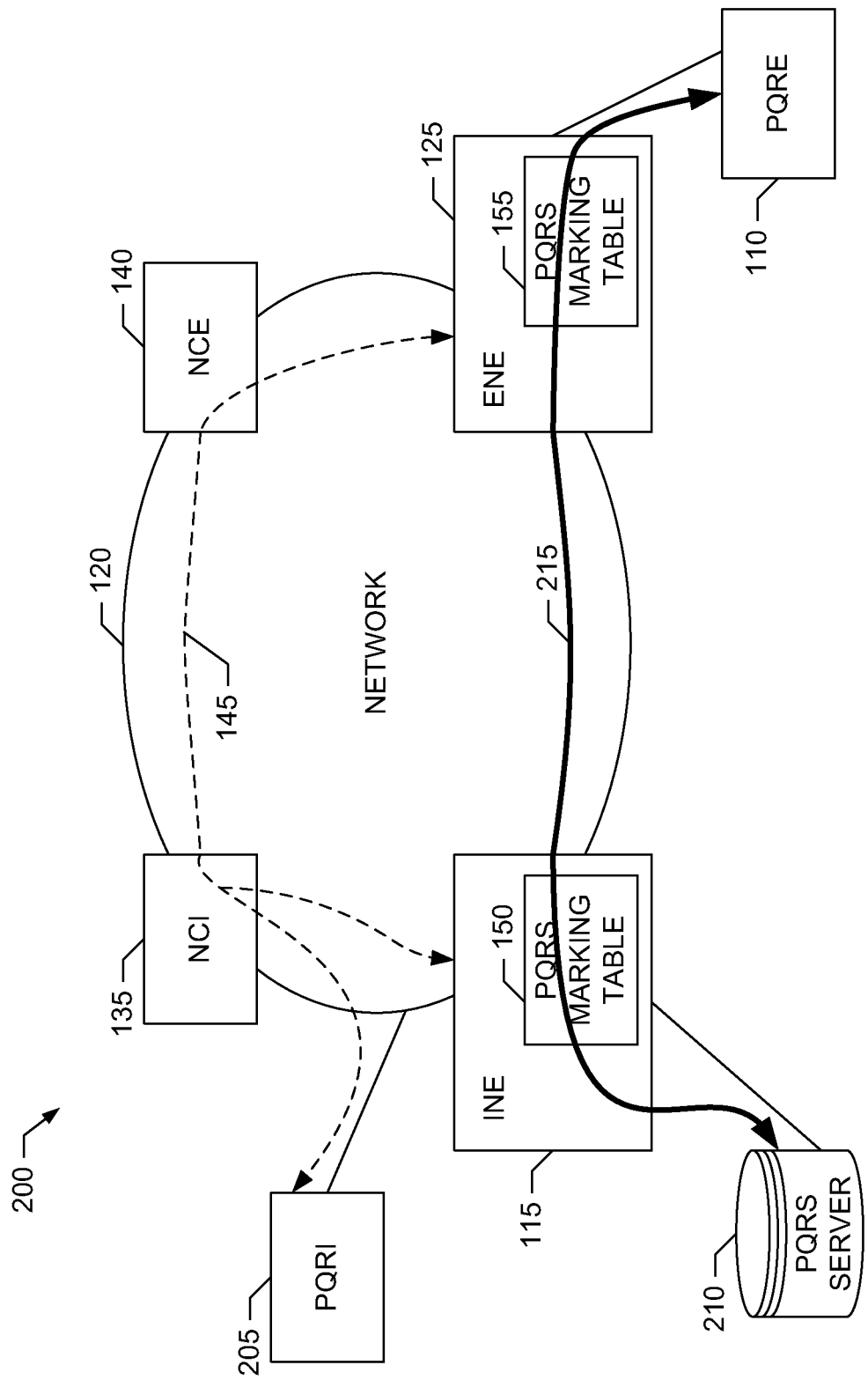
FIG. 2 is a block diagram of a second example communication network supporting QoS priority reassignment according to the methods and apparatus described herein.

A block diagram of a second example communication network 200 supporting the QoS priority reassignment techniques described herein is illustrated in FIG. 2. The second example communication network 200 includes many elements in common with the first example communication network 100 of FIG. 1. As such, like elements in FIGS. 1 and 2 are labeled with the same reference numerals. The detailed descriptions of these like elements are provided above in connection with the discussion of FIG. 1 and, in the interest of brevity, are not repeated in the discussion of FIG. 2.

Turning to FIG. 2, the example communication network 200 includes the PQRE device 110, the INE 115, the network 120, the ENE 125, the NCI 135, the NCE 140, the PQRS control path 145 and the PQRS marking tables 150 and 155 described in detail above in connection with FIG. 1. The communication network 200 of FIG. 2 also includes a PQRI device 205, which is similar to the PQRI device 105 of FIG. 1. For example, the PQRI device 205 can use the PQRS to initiate a temporary QoS priority reassignment of network traffic associated with the PQRE device 110.

However, in the example communication network 200 of FIG. 2, the PQRE device 110 does not exchange network traffic with the PQRI device 205. Instead, the PQRE device 110 exchanges network traffic with a separate PQRS server 210. The PQRS server 210 can be any type of data/media server associated with (e.g., owned, managed and/or operated by) the PQRI. In the illustrated example, the PQRS server 210 is communicatively coupled with the INE 115, which provides access to the network 120. The INE 115, network 120 and ENE 125 implement a data traffic path 215 (also referred to as a media path 215) between the PQRS server 210 and PQRE device 110 via which network traffic can be exchanged. No data traffic path is established between the PQRE device 110 and the PQRI device 205 in the communication network 200. Instead, the PQRI device 205 operates as a PQRS management element via which the PQRI can temporarily reassign (e.g., upgrade) the QoS priority of network traffic between the PQRE device 110 and the PQRS server 210. Upon a successful QoS priority reassignment, network traffic can be exchanged between the PQRE device 110 and the PQRS server 210 using the appropriate reassigned (e.g., upgraded or promoted) QoS priority or priorities stored in the respective PQRS marking tables 150 and 155 as described above.

While the PQRI device 105, INE 115 and PQRS marking table 150 may all be implemented as a single device in at least some example implementations of the communication network 100 of FIG. 1, the PQRI device 205 of FIG. 2 is distinct from the INE 115, PQRS marking table 150 and PQRS server 210 in the communication network 200 of FIG. 2. Furthermore, in the communication network 200, the INE 115, PQRS marking table 150 and PQRS server 210 could be implemented as a single device or as separate devices directly connected to each other or indirectly connected via one or more communication networks. As such, the INE 115, PQRS marking table 150 and PQRS server 210 could be co-located or could reside at two or more different locations.

While example manners of implementing the communication networks 100 and 200 have been illustrated in FIGS. 1-2, one or more of the elements, processes and/or devices illustrated in FIGS. 1-2 may be combined, divided, re-arranged, omitted, eliminated and/or implemented in any other way. Further, the example PQRI device 105, the example PQRE device 110, the example INE 115, the example network 120, the example ENE 125, the example data traffic path 130, the example NCI 135, the example NCE 140, the example PQRS control path 145, the example PQRS marking tables 150 and 155, the example PQRI device 205, the example PQRS server 210, the example data traffic path 215 and/or, more generally, the example communication networks 100 and/or 200 of FIGS. 1-2 may be implemented by hardware, software, firmware and/or any combination of hardware, software and/or firmware. Thus, for example, any of the example PQRI device 105, the example PQRE device 110, the example INE 115, the example network 120, the example ENE 125, the example data traffic path 130, the example NCI 135, the example NCE 140, the example PQRS control path 145, the example PQRS marking tables 150 and 155, the example PQRI device 205, the example PQRS server 210, the example data traffic path 215 and/or, more generally, the example communication networks 100 and/or 200 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example communication networks 100 and/or 200, the example PQRI device 105, the example PQRE device 110, the example INE 115, the example network 120, the example ENE 125, the example data traffic path 130, the example NCI 135, the example NCE 140, the example PQRS control path 145, the example PQRS marking tables 150 and 155, the example PQRI device 205, the example PQRS server 210 and/or the example data traffic path 215 are hereby expressly defined to include a tangible medium such as a memory, digital versatile disk (DVD), compact disk (CD), etc., storing such software and/or firmware. Further still, the example communication networks 100 and/or 200 of FIGS. 1-2 may include one or more elements, processes and/or devices in addition to, or instead of, those illustrated in FIGS. 1-2, and/or may include more than one of any or all of the illustrated elements, processes and devices.

An example implementation of the NCI 135 included in the example communication networks 100 and 200 of FIGS. 1-2 is illustrated in FIG. 3. With reference to communication networks 100 and 200 of FIGS. 1-2, the NCI 135 of FIG. 3 includes a network interface 305 implementing a PQRI control interface 310, an INE control interface 315 and an NCE control interface 320 to exchange PQRS-related control messages with the PQRI devices 105 and/or 205, the INE 115 and the NCE 140, respectively. The network interface 305 can be implemented using any type of wired or wireless data networking technology.

The NCI 135 of FIG. 3 also includes a PQRS invocation processor 325 to invoke a temporary QoS priority reassignment (e.g., upgrade or promotion) for network traffic between the PQRE device 110 and the PQRI device 105 or PQRS server 210 without requiring service provider intervention. The PQRS invocation processor 325 invokes the PQRS and initiates the temporary QoS priority reassignment in response to a control message received via the network interface 305 from the PQRI device 105 or 205. The PQRS invocation processor 325 then sends appropriate control messages to the INE 115 and the NCE 140 via the network interface 305 to complete invocation of the temporary QoS priority reassignment.

To determine whether to allow the temporary QoS priority reassignment to be performed, the PQRS invocation processor 325 also evaluates one or more invocation criteria. For example, the PQRS invocation processor 325 retrieves an invocation count value maintained by an invocation counter 330 included in the NCI 135 of FIG. 3. The invocation count tracks the number of temporary QoS priority reassignments performed by the NCI 135 during a given time period. The invocation count value is used by the PQRS invocation processor 325 to determine whether an invocation frequency limiting the total number of temporary QoS priority reassignments allowed to be performed during the given time period has been exceeded. Additionally or alternatively, the PQRS invocation processor 325 can use the invocation count value maintained by the invocation counter 330 to determine whether a concurrent invocation limit limiting a total number of QoS priority reassignments allowed to be active at any given time has been exceeded. In at least some example implementations, the invocation frequency and/or concurrent invocation limit is specified by the particular PQRS plan/tier to which the PQRI associated with the NCI 135 has subscribed. If the invocation frequency and/or concurrent invocation limit is determined to have been exceeded, the PQRS invocation processor 325 causes a PQRS error processor 335 included in the NCI 135 to generate an invocation error message to be returned to the PQRI device 105 or 205 via the network interface 305.

The NCI 135 of FIG. 3 further includes a PQRS authentication processor 340 to determine whether the PQRI associated with the PQRI device 105 or 205 is authorized to temporarily reassign the QoS priority associated with the PQRE device 110. For example, the PQRS authentication processor 340 determines whether the PQRI associated with the NCI 135 is subscribed to a PQRS and, if so, whether the PQRS covers the PQRE device 110. If authentication is unsuccessful, the PQRS authentication processor 340 causes the PQRS error processor 335 to generate an authentication error message to be returned to the PQRI device 105 or 205 via the network interface 305.

The example NCI 135 of FIG. 3 also includes a PQRS termination processor 345 to monitor one or more termination criteria to determine whether to terminate the temporary QoS priority reassignment of the PQRE device 110. In the illustrated example, the PQRS to which the PQRI associated with the NCI 135 has subscribed specifies an invocation period during which a temporary QoS priority reassignment can be active, and a total amount of network traffic allowed to be exchanged during the invocation period. Accordingly, the PQRS termination processor 345 monitors the invocation period for a particular QoS priority reassignment of the PQRE device 110 using an invocation timer 350 included in the NCI 135 that is initialized by the PQRS invocation processor 325 upon successfully invoking the QoS priority reassignment. Additionally, the PQRS termination processor 345 monitors the total amount of network traffic exchanged with the PQRE device 110 during the invocation period using a traffic monitor 355 included in the NCI 135 that is initialized by the PQRS invocation processor 325 upon successfully invoking the QoS priority reassignment. When one or more of the monitored termination criteria are met, the PQRS termination processor 345 sends appropriate control messages to the INE 115 and the NCE 140 via the network interface 305 to terminate the temporary QoS priority reassignment.

Operation of the network interface 305, the PQRS invocation processor 325, the invocation counter 330, the PQRS error processor 335, the PQRS authentication processor 340, the PQRS termination processor 345, the invocation timer 350 and the traffic monitor 355 included in the NCI 135 of FIG. 3 is described in greater detail below in conjunction with the example message sequence diagrams illustrated in FIGS. 7-10. A flowchart representative of example machine readable instructions that may be executed to implement the NCI 135 of FIG. 3 is illustrated in FIGS. 11A-B and described in greater detail below.

While an example manner of implementing the NCI 135 of FIGS. 1-2 has been illustrated in FIG. 3, one or more of the elements, processes and/or devices illustrated in FIG. 3 may be combined, divided, re-arranged, omitted, eliminated and/or implemented in any other way. Further, the example network interface 305, the example PQRS invocation processor 325, the example invocation counter 330, the example PQRS error processor 335, the example PQRS authentication processor 340, the example PQRS termination processor 345, the example invocation timer 350, the example traffic monitor 355 and/or, more generally, the example NCI 135 of FIG. 3 may be implemented by hardware, software, firmware and/or any combination of hardware, software and/or firmware. Thus, for example, any of the example network interface 305, the example PQRS invocation processor 325, the example invocation counter 330, the example PQRS error processor 335, the example PQRS authentication processor 340, the example PQRS termination processor 345, the example invocation timer 350, the example traffic monitor 355 and/or, more generally, the example NCI 135 could be implemented by one or more circuit(s), programmable processor(s), ASIC(s), PLD(s) and/or FPLD(s), etc. When any of the appended claims are read to cover a purely software and/or firmware implementation, at least one of the example NCI 135, the example network interface 305, the example PQRS invocation processor 325, the example invocation counter 330, the example PQRS error processor 335, the example PQRS authentication processor 340, the example PQRS termination processor 345, the example invocation timer 350 and/or the example traffic monitor 355 are hereby expressly defined to include a tangible medium such as a memory, DVD, CD, etc., storing such software and/or firmware. Further still, the example NCI 135 of FIG. 3 may include one or more elements, processes and/or devices in addition to, or instead of, those illustrated in FIG. 3, and/or may include more than one of any or all of the illustrated elements, processes and devices.

An example implementation of the INE 115 included in the example communication networks 100 and 200 of FIGS. 1-2 is illustrated in FIG. 4. With reference to communication networks 100 and 200 of FIGS. 1-2, the INE 115 of FIG. 4 includes a network interface 405 implementing an NCI control interface 405 to exchange PQRS-related control messages with the NCI 135. The network interface 405 also implements a client data interface 415 to exchange data traffic with the PQRI device 105 or PQRS server 210, and a network data interface 420 to exchange data traffic with the PQRE device 110. The network interface 405 can be implemented using any type of wired or wireless data networking technology.

The INE 115 of FIG. 4 also includes the PQRS marking table 150 to store reassigned (e.g., upgraded or promoted) QoS priority values for active QoS priority reassignments invoked by the NCI 135. For example, the PQRS marking table 150 may store reassigned (e.g., upgraded or promoted) QoS priority values to be used to mark the network traffic from one or more PQRI devices 105 and/or PQRS servers 210 served by the INE 115 to one or more PQRE devices 110 subject to temporary QoS priority reassignment(s). Additionally or alternatively, the PQRS marking table 150 may store different reassigned (e.g., upgraded or promoted) QoS priority values to be used to mark different types of network traffic from a particular PQRI device 105 or PQRS server 210 served by the INE 115 to a particular PQRE device 110. In an example implementation, the PQRS marking table 150 stores a particular QoS priority value in an table entry indexed by the particular PQRI device 105 or PQRS server 210 served by the INE 115, the particular PQRE device 110 subject to the temporary QoS priority reassignment, and/or the particular type of network traffic governed by the stored QoS priority value.

For example, a temporary QoS priority reassignment can cover all network traffic associated with a particular PQRE device 110, resulting in a single reassigned (e.g., upgraded or promoted) QoS priority value to be used to mark network traffic from the PQRI device 105 or PQRS server 210 served by the INE 115 to the PQRE device 110. Alternatively, a temporary QoS priority reassignment can cover only a certain type of network traffic associated with a certain type of application or service accessed by the particular PQRE device 110. For example, a temporary QoS priority reassignment can cover only data download traffic, data upload traffic, video traffic, voice traffic, etc. In such an example, multiple reassigned (e.g., upgraded or promoted) QoS priority values may be stored in the PQRS marking table 150 for a particular PQRE device 110, with each stored QoS priority value used to mark a different type of network traffic from the PQRI device 105 or PQRS server 210 served by the INE 115 to the PQRE device 110.

The INE 115 of FIG. 4 further includes a PQRS marking table processor 425 to create an entry in the marking table 150 to store each reassigned (e.g., upgraded or promoted) QoS priority value when a control message invoking a temporary QoS priority reassignment is received from the NCI 135 via the network interface 405. The PQRS marking table processor 425 also operates to clear this entry in the marking table 150 when a control message terminating the temporary QoS priority reassignment is received from the NCI 135 via the network interface 405.

The INE 115 of FIG. 4 also includes a data packet marker 430 to mark (or re-mark) the QoS priority of network traffic received from the PQRI device 105 or PQRS server 210 via the client data interface 415 for transmission via the network data interface 420 to the PQRE device 110. The data packet marker 430 retrieves the appropriate reassigned (e.g., upgraded or promoted) QoS priority from an entry in the PQRS marking table 150 indexed by: (1) the particular PQRI device 105 or PQRS server 210 from which the network traffic was received, (2) the particular PQRE device 110 that is the destination of the network traffic, and/or (3) the type of network traffic being exchanged.

Figure 12:
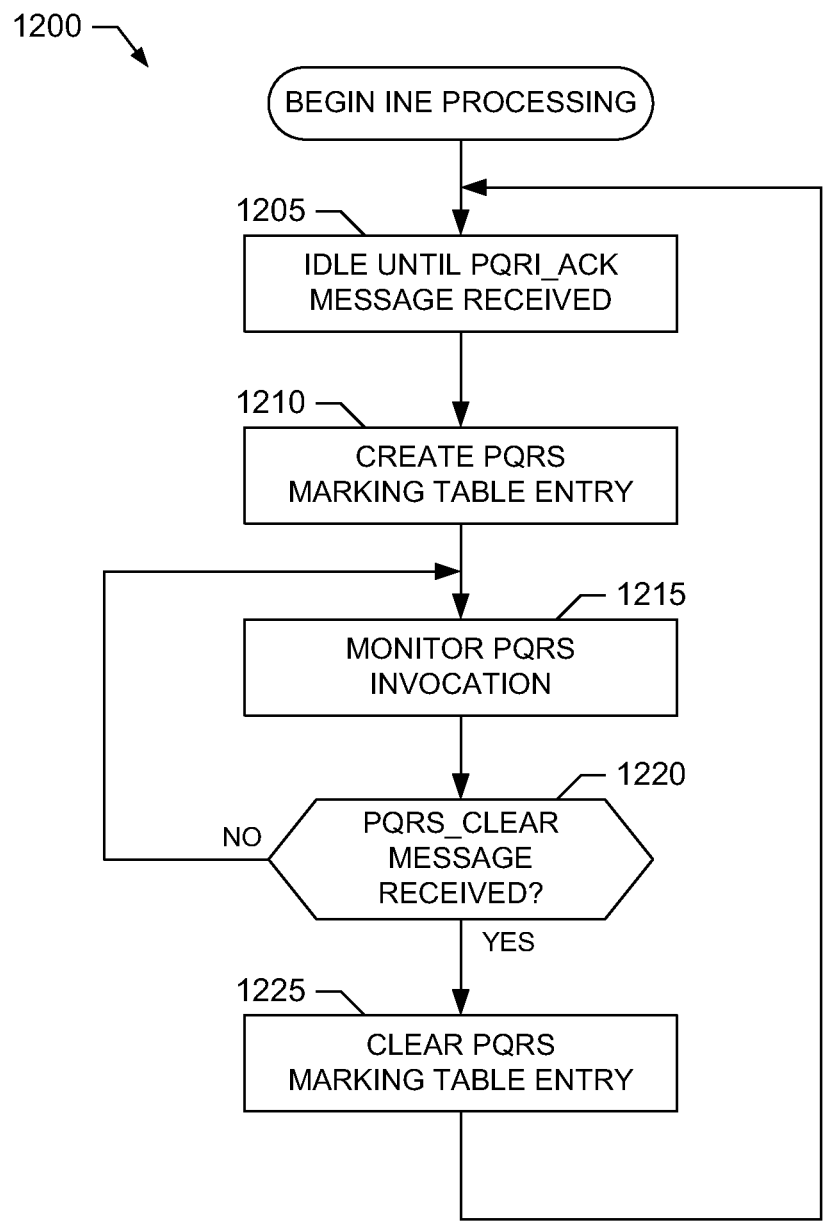
FIG. 12 is a flowchart representative of example machine readable instructions that may be executed to implement QoS priority reassignment functionality in the first example network access element of FIG. 4.

Operation of the network interface 405, the PQRS marking table 150, the PQRS marking table processor 425, and the data packet marker 430 included in the INE 115 of FIG. 4 is described in greater detail below in conjunction with the example message sequence diagrams illustrated in FIGS. 7-10. Flowcharts representative of example machine readable instructions that may be executed to implement the INE 115 of FIG. 4 are illustrated in FIGS. 12 and 15, which are described in greater detail below.

While an example manner of implementing the INE 115 of FIGS. 1-2 has been illustrated in FIG. 4, one or more of the elements, processes and/or devices illustrated in FIG. 4 may be combined, divided, re-arranged, omitted, eliminated and/or implemented in any other way. Further, the example network interface 405, the example PQRS marking table 150, the example PQRS marking table processor 425, the example data packet marker 430 and/or, more generally, the example INE 115 of FIG. 4 may be implemented by hardware, software, firmware and/or any combination of hardware, software and/or firmware. Thus, for example, any of the example network interface 405, the example PQRS marking table 150, the example PQRS marking table processor 425, the example data packet marker 430 and/or, more generally, the example INE 115 could be implemented by one or more circuit(s), programmable processor(s), ASIC(s), PLD(s) and/or FPLD(s), etc. When any of the appended claims are read to cover a purely software and/or firmware implementation, at least one of the example INE 115, the example network interface 405, the example PQRS marking table 150, the example PQRS marking table processor 425 and/or the example data packet marker 430 are hereby expressly defined to include a tangible medium such as a memory, DVD, CD, etc., storing such software and/or firmware. Further still, the example INE 115 of FIG. 4 may include one or more elements, processes and/or devices in addition to, or instead of, those illustrated in FIG. 4, and/or may include more than one of any or all of the illustrated elements, processes and devices.

An example implementation of the NCE 140 included in the example communication networks 100 and 200 of FIGS. 1-2 is illustrated in FIG. 5. With reference to the communication networks 100 and 200 of FIG. 1-2, the NCE 140 of FIG. 5 includes a network interface 505 implementing an NCI control interface 510 and an ENE control interface 515 to exchange PQRS-related control messages with the NCI 135 and the ENE 125, respectively. The network interface 505 can be implemented using any type of wired or wireless data networking technology.

The NCE 140 of FIG. 5 also includes a PQRS invocation processor 520 to allow invocation of a temporary QoS priority reassignment (e.g., upgrade or promotion) for network traffic between the PQRE device 110 and the PQRI device 105 or PQRS server 210 without requiring service provider intervention. The PQRS invocation processor 520 determines whether to allow the temporary QoS priority reassignment in response to a control message received via the network interface 505 from the NCI 135 indicating that the temporary QoS priority reassignment has been invoked by the PQRI device 105 or 205. Additionally, the PQRS invocation processor 520 determines whether to allow the temporary QoS priority reassignment based on whether voluntary invocation or involuntary invocation has been configured for the PQRE device 110. If the temporary QoS priority reassignment is to be allowed, the PQRS invocation processor 520 sends an appropriate control message to the ENE 125 via the network interface 505 to complete invocation of the temporary QoS priority reassignment.

In the case of voluntary invocation, a temporary QoS priority reassignment can be accepted or rejected on behalf of the PQRE device 110 whose QoS priority is to be reassigned. In an example implementation supporting voluntary invocation, the NCE 140 is to act as a proxy for the PQRE device 110 to determine whether to authorize a temporary QoS priority reassignment initiated by the PQRI. In particular, the PQRS invocation processor 520 causes a PQRS authorization processor 525 included in the NCE 140 to evaluate one or more authorization criteria to determine whether to allow the temporary QoS priority reassignment to be performed. For example, the PQRS authorization processor 525 can be configured to evaluate a QoS improvement requirement that an upgraded or promoted QoS priority resulting from the temporary QoS priority reassignment must be an improvement over an existing QoS priority associated with the PQRE device 110. Additionally or alternatively, the PQRS authorization processor 525 can be configured to evaluate a subscription rule requirement that a temporary QoS priority reassignment cannot be prohibited by a rule governing access to the communication network 100 or 200 by the PQRE device 110. For example, temporary QoS priority reassignments may be prohibited for the PQRE device 110 when the PQRE device 110 belongs to an enterprise network governed by certain QoS priorities, or based on traffic engineering rules at the access point of the PQRE device 110 to the communication network 100 or 200.

Furthermore, in the case of voluntary invocation, if temporary QoS priority reassignment is determined to be authorized, the PQRS authorization processor 525 sends appropriate control messages to the ENE 125 and the NCI 135 via the network interface 505 to complete invocation of the temporary QoS priority reassignment. If temporary QoS priority reassignment is determined to not be authorized, the PQRS authorization processor 525 sends appropriate error message to the NCI 135 via the network interface 505 to cancel invocation of the temporary QoS priority reassignment.

In contrast, in the case of involuntary invocation, temporary QoS priority reassignment is to be allowed automatically (or, in other words, the temporary QoS priority reassignment must be accepted on behalf of the PQRE device 110 and cannot be rejected). As such, the PQRS authorization processor 525 does not evaluate any authorization rules. Instead, the PQRS invocation processor 520 automatically sends appropriate control messages to the ENE 125 and the NCI 135 via the network interface 505 to complete invocation of the temporary QoS priority reassignment.

The NCE 140 of FIG. 5 further includes an ENE information processor 530 to determine identification information, such as network routing information, destination IP addresses, etc., for the PQRE device 110 whose QoS priority is to be temporarily reassigned, and for the ENE 125 serving the PQRE device 110. The resulting identification information, also referred to herein as ENE information, is passed to the ENE 125 via the network interface 505 to allow the ENE to create the appropriate table entries in the PQRS marking table 155, as described in greater detail below.

The NCE 140 of FIG. 5 also includes a PQRS termination processor 535 to terminate the temporary QoS priority reassignment of the network traffic between the PQRE device 110 and the PQRI device 105 or PQRS server 210 in response to receiving a termination control message via the network interface 505 from the NCI 135. When the termination control message is received, the PQRS termination processor 345 sends an appropriate control message to the ENE 125 via the network interface 505 to terminate the associated temporary QoS priority reassignment. Additionally, in some example implementations, when temporary QoS priority reassignment is determined not to be authorized, the PQRS termination processor 535 may be responsible for sending the appropriate error message to the NCI 135 via the network interface 505 to terminate invocation of the temporary QoS priority reassignment.

Figure 13:
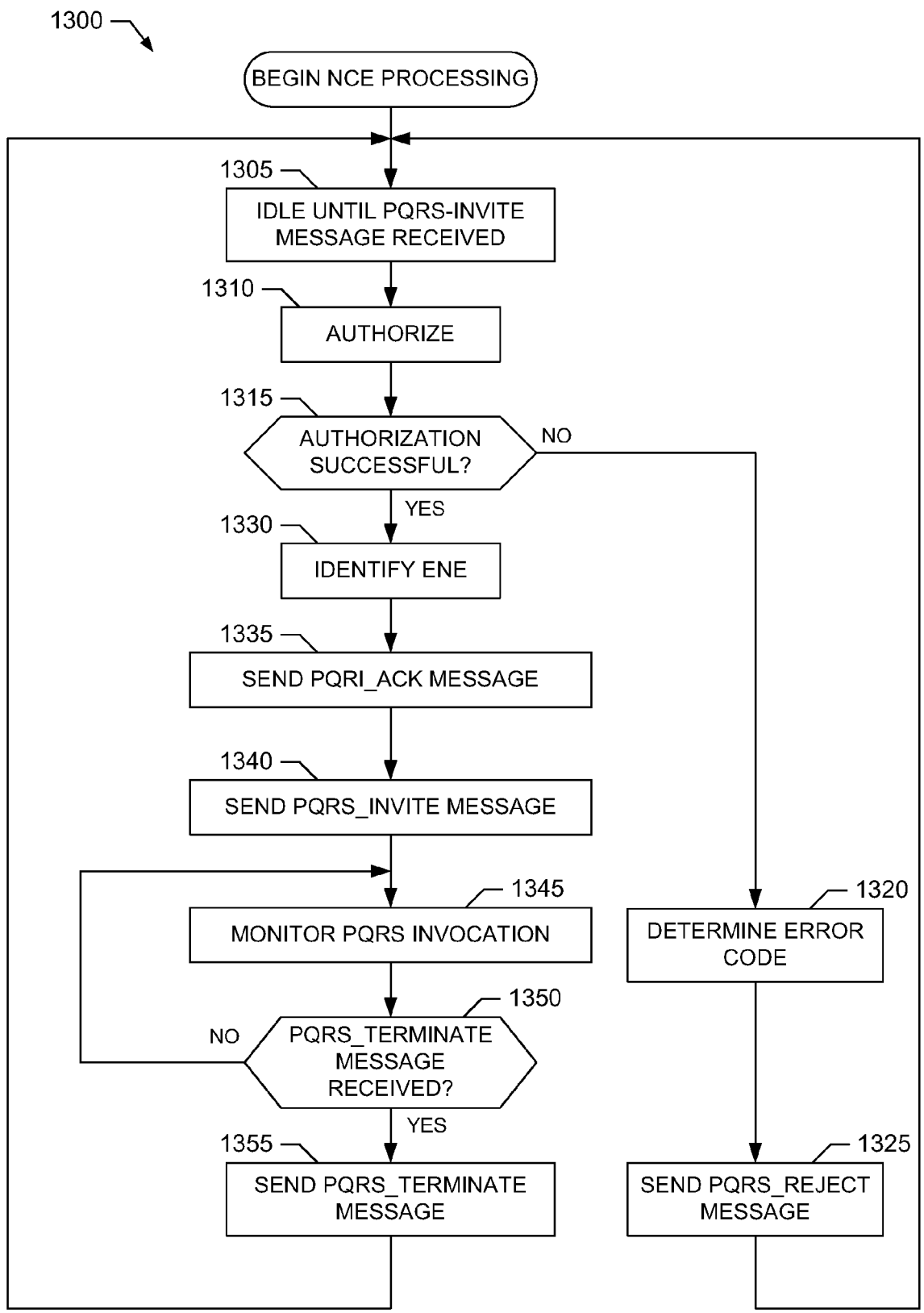
FIG. 13 is a flowchart representative of example machine readable instructions that may be executed to implement QoS priority reassignment functionality in the second example network control element of FIG. 5.

Operation of the network interface 505, the PQRS invocation processor 520, the PQRS authorization processor 525, the ENE information processor 530 and the PQRS termination processor 535 included in the NCE 140 of FIG. 5 is described in greater detail below in conjunction with the example message sequence diagrams illustrated in FIGS. 7-10. A flowchart representative of example machine readable instructions that may be executed to implement the NCE 140 of FIG. 5 is illustrated in FIG. 13 and described in greater detail below.

While an example manner of implementing the NCE 140 of FIGS. 1-2 has been illustrated in FIG. 5, one or more of the elements, processes and/or devices illustrated in FIG. 5 may be combined, divided, re-arranged, omitted, eliminated and/or implemented in any other way. Further, the example network interface 505, the example PQRS invocation processor 520, the example PQRS authorization processor 525, the example ENE information processor 530, the example PQRS termination processor 535 and/or, more generally, the example NCE 140 of FIG. 5 may be implemented by hardware, software, firmware and/or any combination of hardware, software and/or firmware. Thus, for example, any of the example network interface 505, the example PQRS invocation processor 520, the example PQRS authorization processor 525, the example ENE information processor 530, the example PQRS termination processor 535 and/or, more generally, the example NCE 140 could be implemented by one or more circuit(s), programmable processor(s), ASIC(s), PLD(s) and/or FPLD(s), etc. When any of the appended claims are read to cover a purely software and/or firmware implementation, at least one of the example NCE 140, the example network interface 505, the example PQRS invocation processor 520, the example PQRS authorization processor 525, the example ENE information processor 530 and/or the example PQRS termination processor 535 are hereby expressly defined to include a tangible medium such as a memory, DVD, CD, etc., storing such software and/or firmware. Further still, the example NCE 140 of FIG. 5 may include one or more elements, processes and/or devices in addition to, or instead of, those illustrated in FIG. 5, and/or may include more than one of any or all of the illustrated elements, processes and devices.

An example implementation of the ENE 125 included in the example communication networks 100 and 200 of FIGS. 1-2 is illustrated in FIG. 6. With reference to communication networks 100 and 200 of FIGS. 1-2, the ENE 125 of FIG. 6 includes a network interface 605 implementing an NCE control interface 605 to exchange PQRS-related control messages with the NCE 140. The network interface 605 also implements a client data interface 615 to exchange data traffic with the PQRE device 110, and a network data interface 620 to exchange data traffic with the PQRI device 105 or PQRS server 210. The network interface 605 can be implemented using any type of wired or wireless data networking technology.

The ENE 125 of FIG. 6 also includes the PQRS marking table 155 to store reassigned (e.g., upgraded or promoted) QoS priority values for active QoS priority reassignments allowed to be invoked by the NCE 140. For example, the PQRS marking table 155 may store reassigned (e.g., upgraded or promoted) QoS priority values to be used to mark the network traffic from one or more one or more PQRE devices 110 served by the ENE 125 to one or more PQRI devices 105 and/or PQRS servers 210. Additionally or alternatively, the PQRS marking table 155 may store different reassigned (e.g., upgraded or promoted) QoS priority values to be used to mark different types of network traffic from a particular PQRE device 110 served by the ENE 125 to a particular PQRI device 105 or PQRS server 210. In an example implementation, the PQRS marking table 155 stores each QoS priority value in a table entry indexed by the particular PQRI device 105 or PQRS server 210, the particular PQRE device 110 served by the ENE 125, and/or the particular type of network traffic governed by the stored QoS priority value.

For example, a temporary QoS priority reassignment can cover all network traffic associated with a particular PQRE device 110, resulting in a single reassigned (e.g., upgraded or promoted) QoS priority value to be used to mark network traffic from the PQRE device 110 served by the ENE 125 to the PQRI device 105 or PQRS server 210. Alternatively, and as described above, a temporary QoS priority reassignment can cover only a certain type of network traffic associated with a certain type of application or service accessed by the particular PQRE device 110. In such an example, multiple reassigned (e.g., upgraded or promoted) QoS priority values may be stored in the PQRS marking table 155 for a particular PQRE device 110, with each stored QoS priority value used to mark a different type of network traffic from the PQRE device 110 served by the ENE 125 to the PQRI device 105 or PQRS server 210.

The ENE 125 of FIG. 6 further includes a PQRS marking table processor 625 to create an entry in the marking table 155 to store each reassigned (e.g., upgraded or promoted) QoS priority value when a control message invoking a temporary QoS priority reassignment is received from the NCE 140 via the network interface 605. The PQRS marking table processor 625 also operates to clear this entry in the marking table 155 when a control message terminating the temporary QoS priority reassignment is received from the NCE 140 via the network interface 605.

The ENE 125 of FIG. 6 also includes a data packet marker 630 to mark (or re-mark) the QoS priority of network traffic received from the PQRE device 110 via the client data interface 615 for transmission via the network data interface 620 to the PQRI device 105 or PQRS server 210. The data packet marker 630 retrieves the appropriate reassigned (e.g., upgraded or promoted) QoS priority from an entry in the PQRS marking table 155 indexed by: (1) the particular PQRE device 110 from which the network traffic was received, (2) the particular PQRI device 105 or PQRS server 210 that is the destination of the network traffic, and/or (3) the type of network traffic being exchanged.

Figure 14:
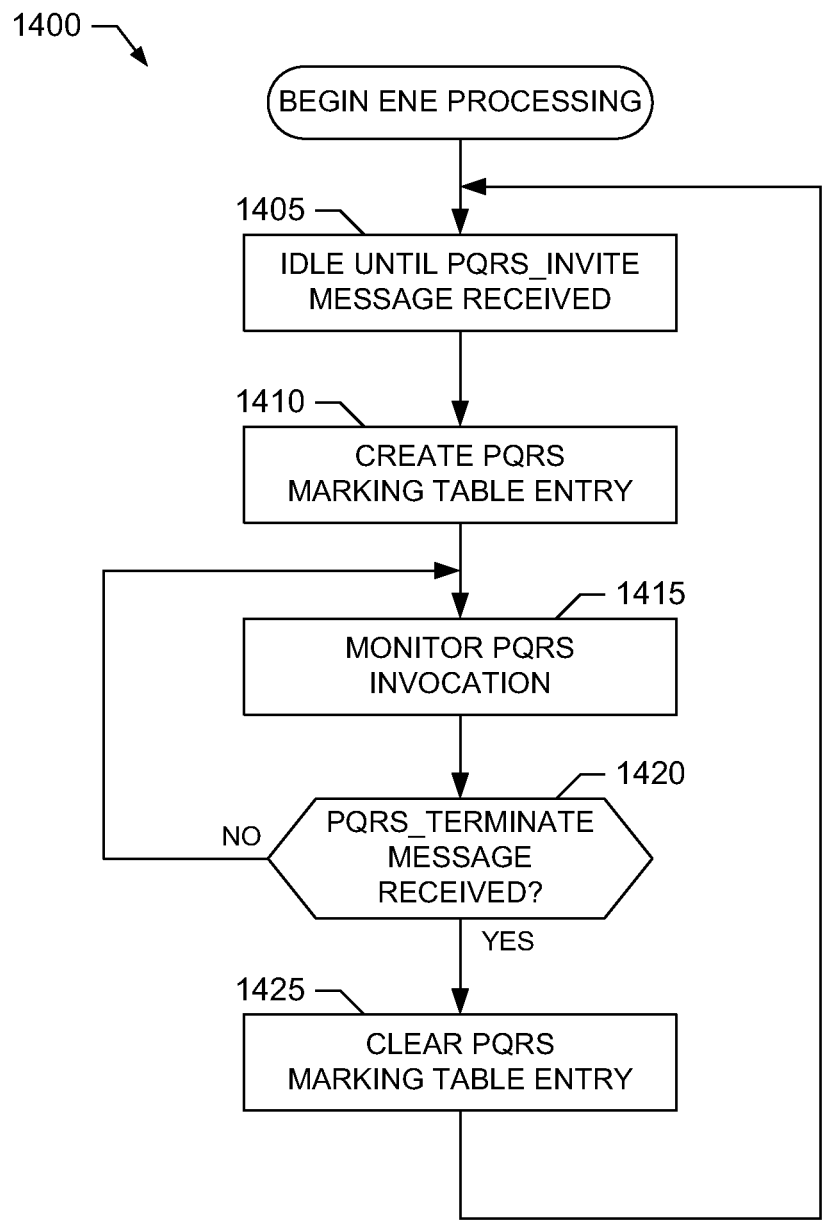
FIG. 14 is a flowchart representative of example machine readable instructions that may be executed to implement QoS priority reassignment functionality in the second example network access element of FIG. 6.

Operation of the network interface 605, the PQRS marking table 155, the PQRS marking table processor 625, and the data packet marker 630 included in the ENE 125 of FIG. 6 is described in greater detail below in conjunction with the example message sequence diagrams illustrated in FIGS. 7-10. Flowcharts representative of example machine readable instructions that may be executed to implement the ENE 125 of FIG. 6 are illustrated in FIGS. 14 and 16, which are described in greater detail below.

While an example manner of implementing the ENE 125 of FIGS. 1-2 has been illustrated in FIG. 6, one or more of the elements, processes and/or devices illustrated in FIG. 6 may be combined, divided, re-arranged, omitted, eliminated and/or implemented in any other way. Further, the example network interface 605, the example PQRS marking table 155, the example PQRS marking table processor 625, the example data packet marker 630 and/or, more generally, the example ENE 125 of FIG. 6 may be implemented by hardware, software, firmware and/or any combination of hardware, software, and/or firmware. Thus, for example, any of the example network interface 605, the example PQRS marking table 155, the example PQRS marking table processor 625, the example data packet marker 630 and/or, more generally, the example ENE 125 could be implemented by one or more circuit(s), programmable processor(s), ASIC(s), PLD(s) and/or FPLD(s), etc. When any of the appended claims are read to cover a purely software and/or firmware implementation, at least one of the example ENE 125, the example network interface 605, the example PQRS marking table 155, the example PQRS marking table processor 625 and/or the example data packet marker 630 are hereby expressly defined to include a tangible medium such as a memory, DVD, CD, etc., storing such software and/or firmware. Further still, the example ENE 125 of FIG. 6 may include one or more elements, processes and/or devices in addition to, or instead of, those illustrated in FIG. 6, and/or may include more than one of any or all of the illustrated elements, processes and devices.

Turning to FIGS. 7-10, example message sequence diagrams are shown illustrating temporary QoS priority reassignment operations performed in the example communication network 100 of FIG. 1. The example message sequence diagrams of FIGS. 7-10 are also applicable to temporary QoS priority reassignment operations performed in the example communication networks 200 of FIG. 2, but with the QoS priority reassignment being initiated by the PQRI device 205 instead of the PQRI device 105, and with network traffic being exchanged with the PQRS server 210 instead of the PQRI device 105. The messages depicted in the example message sequence diagrams of FIGS. 7-10 can be implemented by proprietary messages according to a proprietary communication protocol and/or by adapting existing messages used in publicly-available communication protocols. For example, the messages depicted in FIGS. 7-10 could be implemented by adapting control messages used in the session initiation protocol (SIP).

Figure 7:
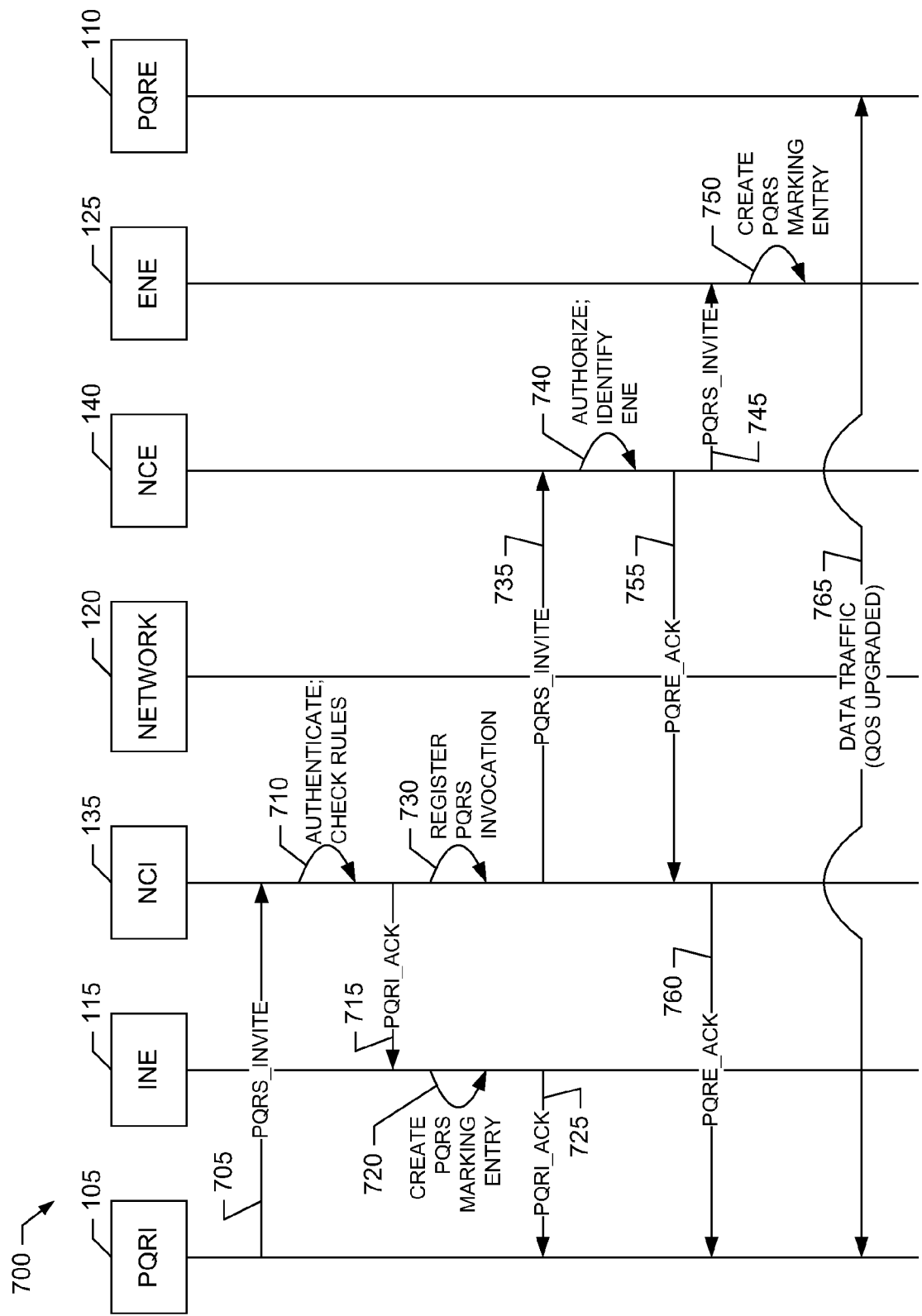
FIG. 7 illustrates an example message sequence diagram corresponding to a successful invocation of a QoS priority reassignment performed in the first and/or second example communication networks of FIGS. 1-2.

In particular, an example message sequence diagram 700 corresponding to a scenario in which a temporary QoS priority reassignment is successfully invoked is depicted in FIG. 7. With reference to FIGS. 1 and 3-6, the message sequence diagram 700 of FIG. 7 begins with the PQRI using the PQRI device 105 to send a PQRS_INVITE message 705 via the INE 115 to the NCI 135 to initiate a temporary QoS priority reassignment of network traffic between the PQRE device 110 and the PQRI device 105. In an example implementation, the PQRS_INVITE message 705 includes one or more of the following parameters: PQRE_ID, App_Type, Invocation_Period and Total_Data_Amount.

In such an example implementation, the PQRE_ID parameter identifies the PQRE device 110 whose QoS priority is to be temporarily reassigned (e.g., upgraded or promoted) in response to the PQRS_INVITE message 705. For example, the PQRE_ID parameter could correspond to an IP address, a landline phone number, a mobile phone number, etc., identifying the PQRE device 110. The App_Type parameter identifies the applications (or services) accessed (e.g., launched) on the PQRI device 105 by the PQRE and, in particular, the PQRE device 110 for which associated network traffic is to be the subject of a temporary QoS priority reassignment (e.g., upgrade or promotion). For example, the App_Type parameter can be set to "ALL" to indicate that QoS priorities of network traffic associated with all application types is to be reassigned (e.g., upgraded or promoted). In other example, the App_Type parameter can be set to "DATA_DOWNLOAD_ONLY," "DATA_UPLOAD_ONLY," "VIDEO_ONLY," "VOICE_ONLY," etc., or any combination thereof, to indicate that network traffic associated with only the indicated application type(s) is to be reassigned (e.g., upgraded or promoted). The Invocation_Period and Total_Data_Amount parameters correspond to termination criteria specified by the PQRS to which the PQRI has subscribed. In particular, Invocation_Period specifies the maximum period during which a temporary QoS priority reassignment can be active, and Total_Data_Amount specifies the total amount of network traffic that can be exchanged during the specified Invocation_Period.

Upon receipt of the PQRS_INVITE message 705, the NCI 135 performs an authentication and invocation procedure 710 to determine whether the PQRI is authorized to temporarily reassign the QoS priority associated with the PQRE device 110 and, if so, whether the temporary QoS priority reassignment can be invoked under the present circumstances. For example, the PQRS authentication processor 335 in the NCI 135 determines whether the PQRI is subscribed to a PQRS and, if so, whether the PQRS covers the PQRE device 110. Additionally, the PQRS invocation processor 325 in the NCI 135 evaluates one or more invocation criteria as described above to determine whether to allow the temporary QoS priority reassignment to be performed.

In the example message sequence 700 of FIG. 7, the NCI 135 determines via the authentication and invocation procedure 710 that the temporary QoS priority reassignment initiated by receipt of the PQRS_INVITE message 705 can be invoked. Accordingly, the NCI 135 sends a PQRI_ACK message 715 to the INE 115 containing the PQRE_ID and App_Type parameters from the PQRS_INVITE message 705. In response, the PQRS marking table processor 425 in the INE 115 performs a PQRS marking entry creation procedure 720 to create one or more entries in its PQRS marking table 150 indexed by PQRE_ID, App_Type and a PQRI identifier determined from the source of the PQRS_INVITE message 705 to store the reassigned (e.g., upgraded or promoted) QoS priority value(s) to be used to mark network traffic from the PQRI device 105 to the PQRE device 110. The INE 115 then sends a PQRI_ACK message 725 to the PQRI device 105 to indicate that PQRI-side preparations for the temporary QoS priority reassignment procedure are complete.

In response to determining that the temporary QoS priority reassignment initiated by receipt of the PQRS_INVITE message 705 can be invoked, the NCI 135 also performs a PQRS invocation registration procedure 730. To perform the PQRS invocation registration procedure 730, the PQRS invocation processor 325 initializes the invocation timer 350 in the NCI 135 with the Invocation_Period parameter value included in the PQRS_INVITE message 705. Additionally or alternatively, the PQRS invocation processor 325 initializes the traffic monitor 355 in the NCI 135 with the Total_Data_Amount parameter value included in the PQRS_INVITE message 705.

After performing the PQRS invocation registration procedure 730, the NCI 135 sends a PQRS_INVITE message 735 containing the PQRE_ID and App_Type parameters to the NCE 140 to initiate PQRE-side preparations for the temporary QoS priority reassignment procedure. In response, the NCE 140 performs an authorization and ENE identification procedure 740. For example, if voluntary invocation is configured, the PQRS invocation processor 520 in the NCE 140 evaluates one or more authorization criteria as described above to determine whether to allow the temporary QoS priority reassignment being initiated by the PQRS_INVITE message 735. If involuntary invocation is configured, the NCE 140 automatically determines that the temporary QoS priority reassignment being initiated by the PQRS_INVITE message 735 is allowed. In either case, if the temporary QoS priority reassignment is allowed, the ENE information processor 530 in the NCE 140 then determines identification information as described above for the PQRE device 110 whose QoS priority is to be temporarily reassigned, and for the ENE 125 serving the PQRE device 110.

In the example message sequence 700 of FIG. 7, the NCE 140 determines via the authorization and ENE identification procedure 740 that the temporary QoS priority reassignment initiated by receipt of the PQRS_INVITE message 735 is allowed. Accordingly, the NCE 140 sends a PQRS_INVITE message 745 to the ENE 125 containing the PQRE_ID and App_Type parameters from the PQRS_INVITE message 735. In response, the PQRS marking table processor 625 in the ENE 125 performs a PQRS marking entry creation procedure 750 to create one or more entries in its PQRS marking table 155 indexed by PQRE_ID, App_Type and a PQRI identifier determined from the source of the PQRS_INVITE message 735 to store the reassigned (e.g., upgraded or promoted) QoS priority value(s) to be used to mark network traffic from the PQRE device 110 to the PQRI device 105. In some examples, the NCE 140 also sends a PQRI_ACK message 755 to the NCI device 135, which in turn sends another PQRI_ACK message 760 to the PQRI device 105 to indicate that PQRE-side preparations for the temporary QoS priority reassignment procedure are complete. However, some examples omit the PQRI_ACK messages 755 and 760.

Subsequently, network traffic 765 is exchanged between the PQRI device 105 and the PQRE device 110 in the service provider's communication network 100 using the temporarily reassigned (e.g., upgraded or promoted) QoS priority or priorities stored in the marking table 150 of the INE 115 and the marking table 155 of the ENE 125. The example message sequence diagram 700 of FIG. 7 then ends.

Figure 8:
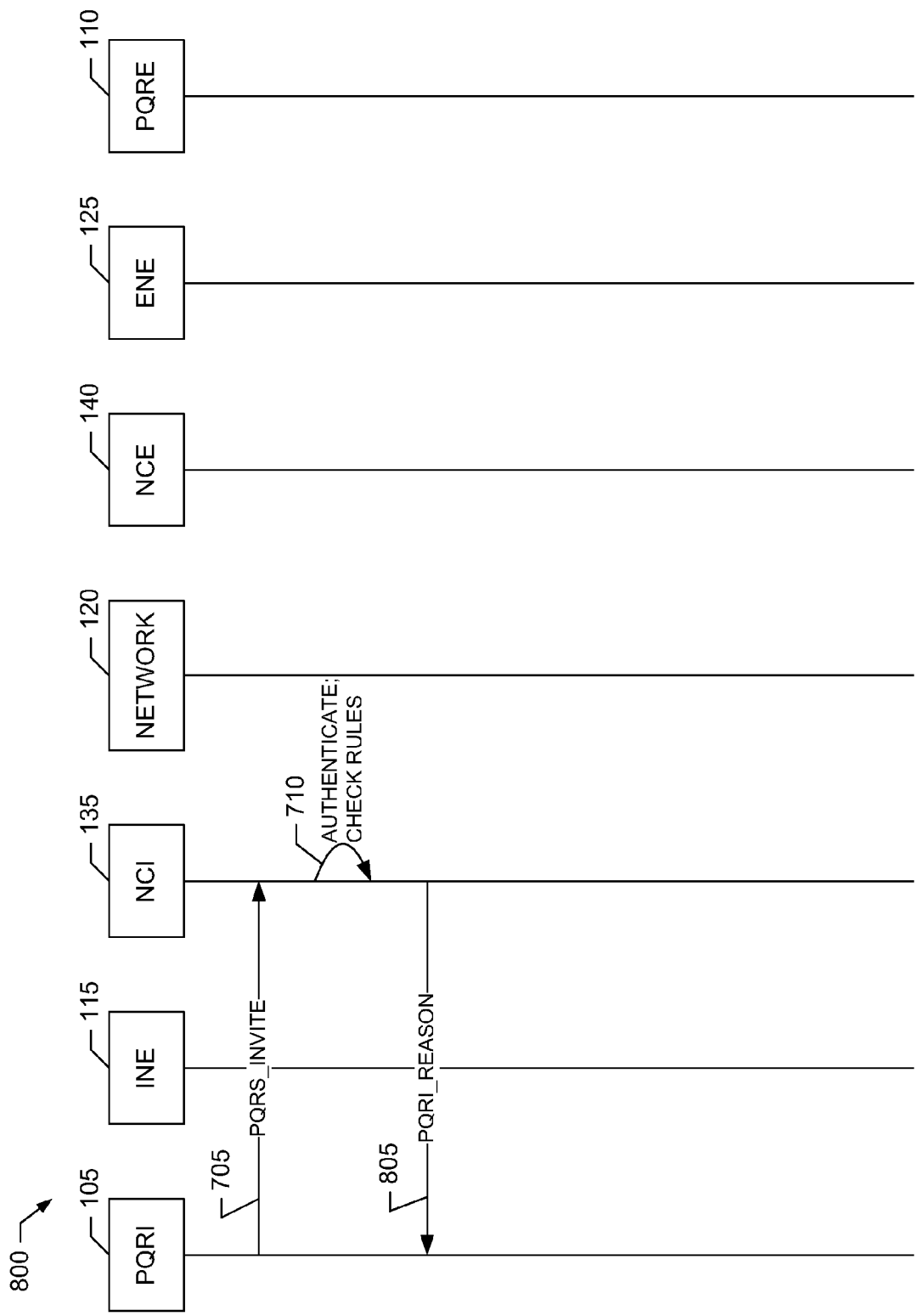
FIG. 8 illustrates an example message sequence diagram corresponding to a failed authentication during a QoS priority reassignment performed in the first and/or second example communication networks of FIGS. 1-2.

An example message sequence diagram 800 corresponding to a scenario in which the NCI 135 determines that a temporary QoS priority reassignment is not able to be invoked is depicted in FIG. 8. Operation of the message sequence diagram 800 from sending of the PQRS_INVITE message 705 to performing the authentication and invocation procedure 710 is substantially the same as for the message sequence diagram 700 of FIG. 7, which is described in detail above. Accordingly, in the interest of brevity, the details of the operation of the message sequence diagram 800 from sending of the PQRS_INVITE message 705 to performing the authentication and invocation procedure 710 are not duplicated here.

Continuing with the description of the message sequence diagram 800 of FIG. 8, in the illustrated example, the NCI 135 determines from performing the authentication and invocation procedure 710 that the temporary QoS priority reassignment initiated by receipt of the PQRS_INVITE message 705 cannot be invoked. For example, authorization of the PQRI may have failed, or one or more of the specified invocation criteria may not have been met. In response to determining that invocation has failed, the PQRS error processor 335 in the NCI 135 generates an invocation error message that is returned to the PQRI device 105 in the form of a PQRI_REASON message 805. The PQRI_REASON message 805 includes a REASON parameter set to a value indicating the reason why PQRS invocation failed at the NCI 135. For example, a first value may indicate authentication failed, whereas a second value may indicate that one or more invocation criteria failed, with a specific value assigned to each of the invocation criteria. The example message sequence diagram 800 of FIG. 8 then ends.

Figure 9:
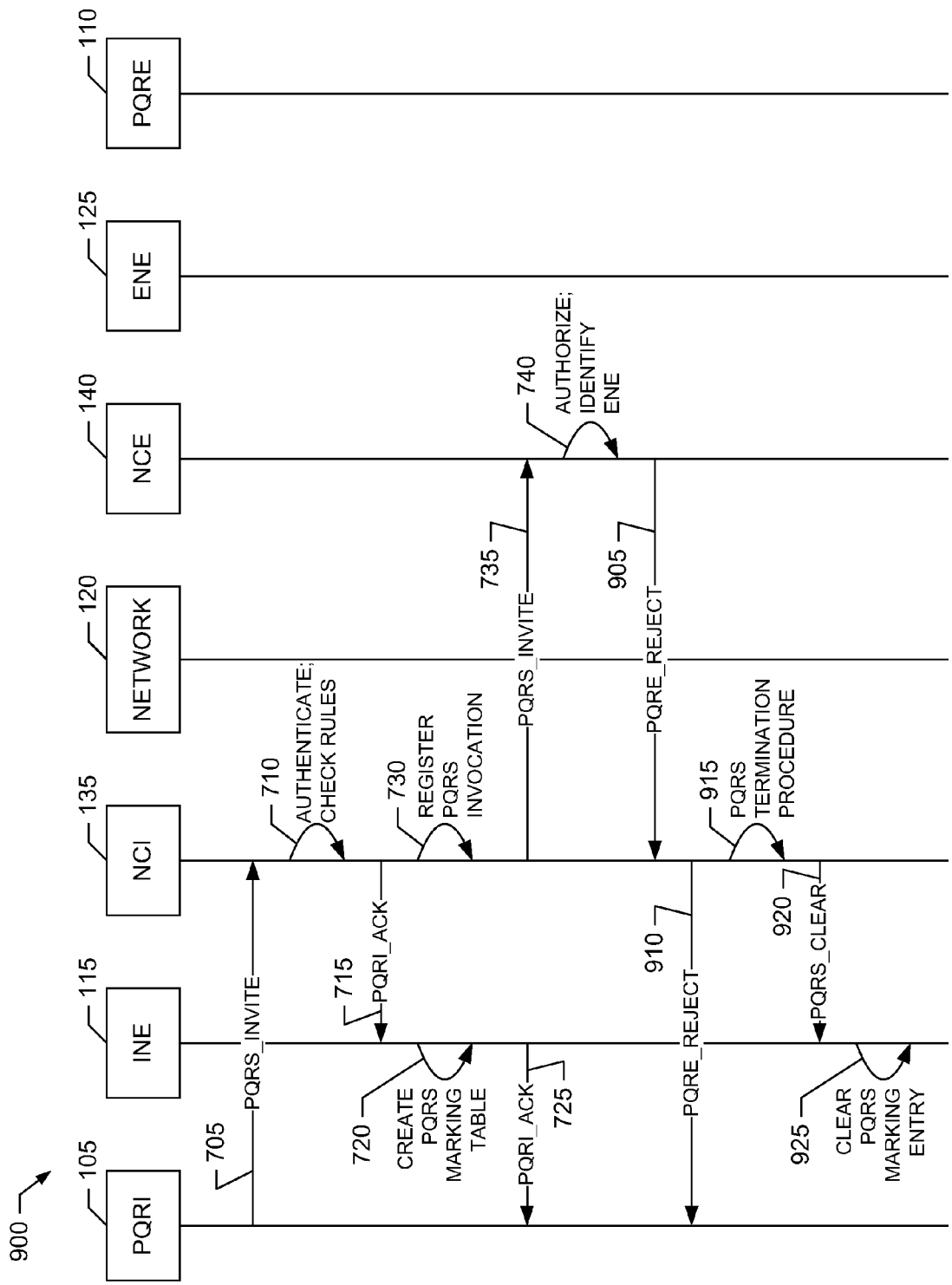
FIG. 9 illustrates an example message sequence diagram corresponding to a failed authorization during a QoS priority reassignment performed in the first and/or second example communication networks of FIGS. 1-2.

An example message sequence diagram 900 corresponding to a scenario in which the NCE 140 determines that a temporary QoS priority reassignment is not authorized is depicted in FIG. 9. Operation of the message sequence diagram 900 from sending of the PQRS_INVITE message 705 to performing the authorization and ENE identification procedure 740 is substantially the same as for the message sequence diagram 700 of FIG. 7, which is described in detail above. Accordingly, in the interest of brevity, the details of the operation of the message sequence diagram 900 from sending of the PQRS_INVITE message 705 to performing the authorization and ENE identification procedure 740 are not duplicated here.

Continuing with the description of the message sequence diagram 900 of FIG. 9, in the illustrated example, the NCE 140 determines from performing the authorization and ENE identification procedure 740 (e.g., based on evaluating the one or more authorization criteria) that the temporary QoS priority reassignment initiated by receipt of the PQRS_INVITE message 735 is not authorized. In response, the NCE 140 returns a PQRE_REJECT message 905 to the NCI 135 indicating that invocation of the temporary QoS priority reassignment has been denied by the NCE 140. The NCI 135 then returns a similar PQRE_REJECT message 910 to the PQRI device 105. The PQRE_REJECT messages 905 and 910 include a REJECT parameter having a value indicating which of the one or more authorization criteria were not met. In an alternative example of FIG. 9, the NCI 135 infers that the temporary QoS priority reassignment was not authorized by a failure to receive a PQRE_ACK message 755 during a timeout period and, thus, the PQRE_REJECT messages 905 and 910 are omitted.

Also in response to receiving the PQRE_REJECT message 905 (or after a timeout period has expired without receipt of the PQRE_ACK message 755), the NCI 135 performs a PQRS termination procedure 915 in which the PQRS termination processor 345 in the NCI 135 decrements the invocation counter 330 and resets the invocation timer 350 and the traffic monitor 355 to undo the failed PQRS invocation. Additionally, the PQRS termination processor 345 in the NCI 135 sends a PQRS_CLEAR message 920 to the INE 115. In response to the PQRS_CLEAR message 920, the PQRS marking table processor 425 in the INE 115 performs a PQRS marking entry clearing procedure 925 to clear any entries in the PQRS marking table 150 created by the failed PQRS invocation. The example message sequence diagram 900 of FIG. 9 then ends.

Figure 10:
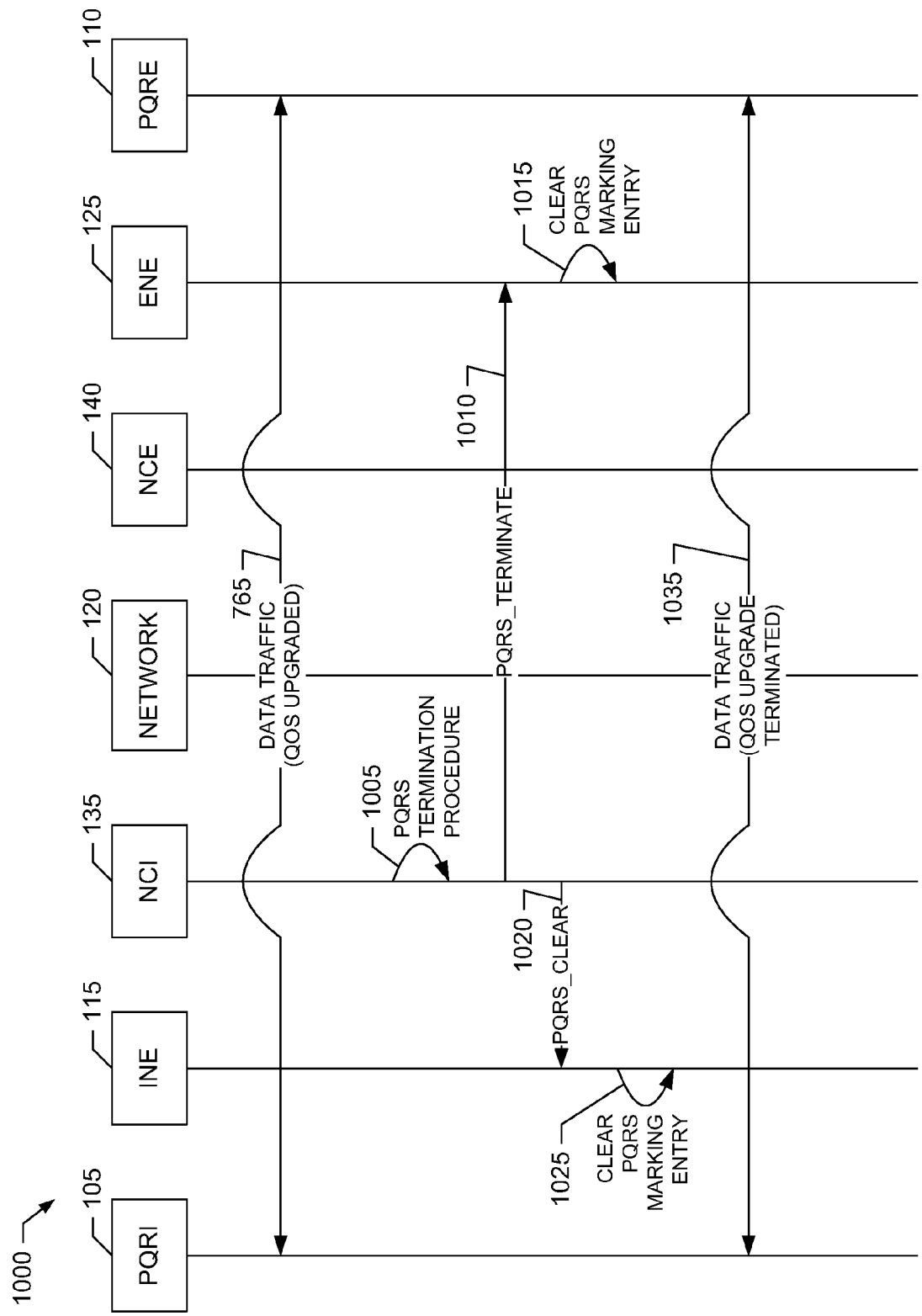
FIG. 10 illustrates an example message sequence diagram corresponding to termination of a QoS priority reassignment performed in the first and/or second example communication networks of FIGS. 1-2.
Figure 11A:
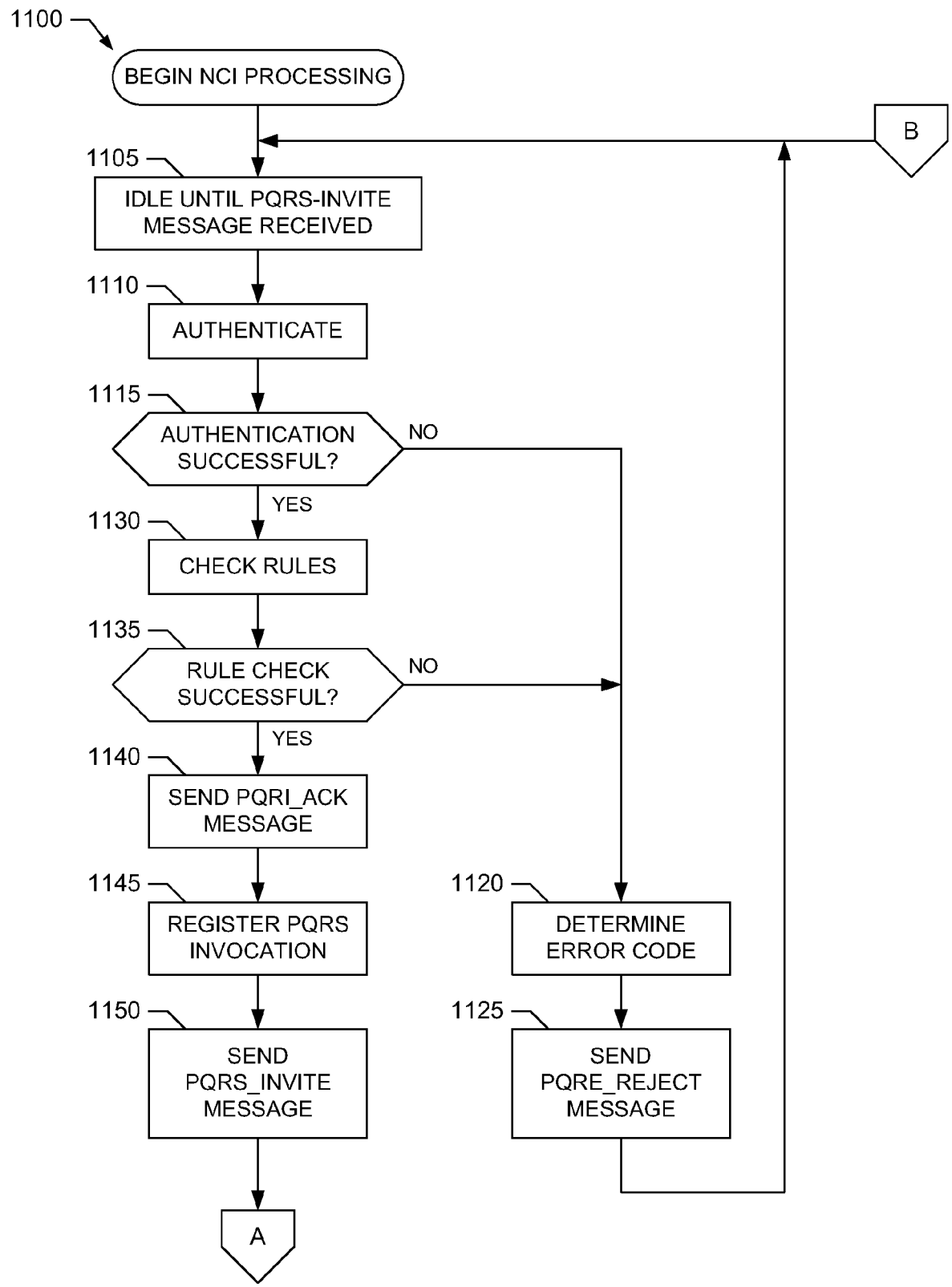
FIGS. 11A-11B collectively form a flowchart representative of example machine readable instructions that may be executed to implement QoS priority reassignment functionality in the first example network control element of FIG. 3.
Figure 11B:
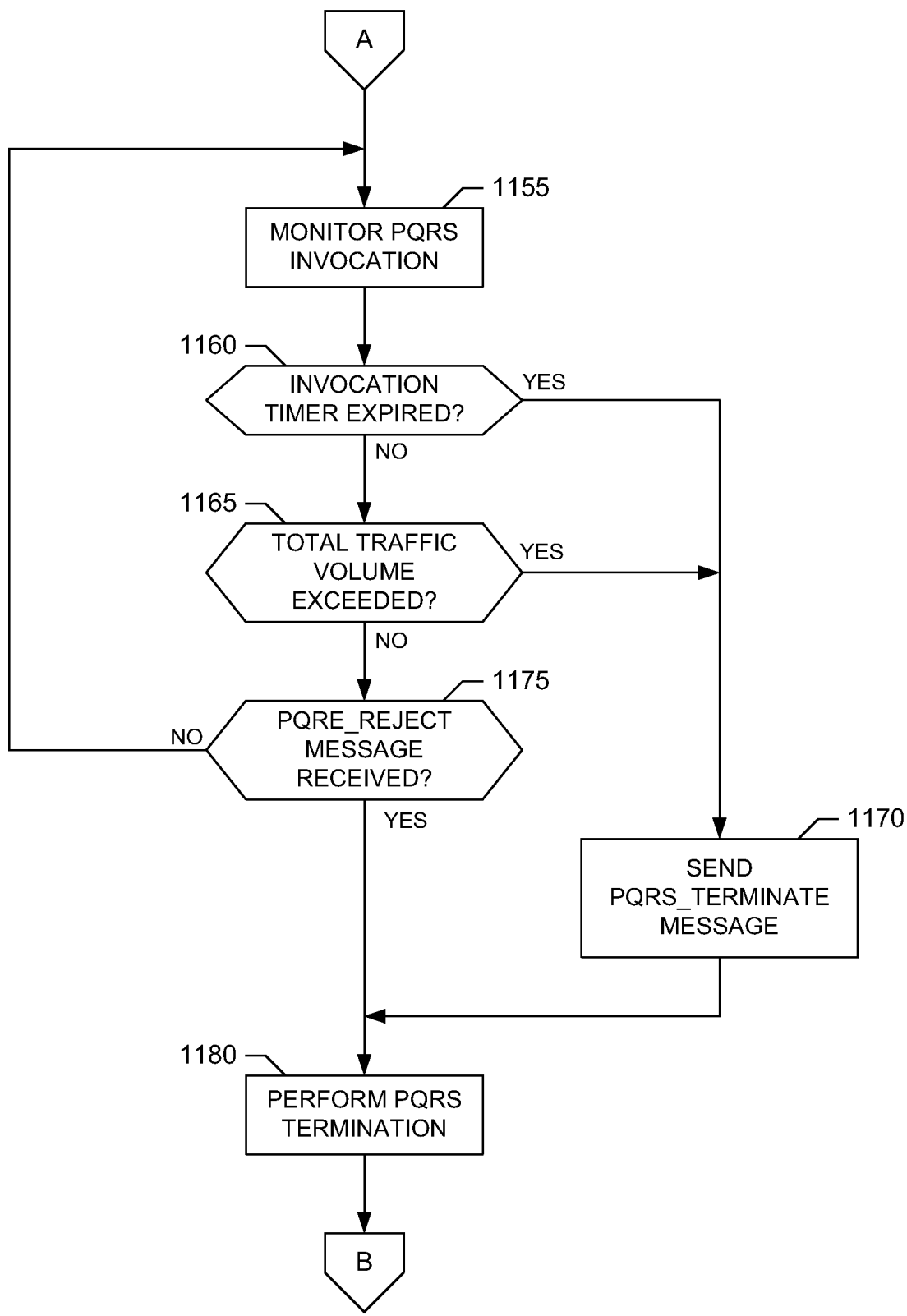

An example message sequence diagram 1000 corresponding to a scenario in which a temporary QoS priority reassignment is terminated is depicted in FIG. 10. The example message sequence diagram 1000 begins at the end of the example message sequence diagram 700 at which network traffic 765 is being exchanged between the PQRI device 105 and the PQRE device 110 in the service provider's communication network 100 using the temporarily reassigned (e.g., upgraded or promoted) QoS priority or priorities stored in the marking table 150 of the INE 115 and the marking table 155 of the ENE 125. The PQRS termination processor 345 in the NCI 135 then performs a PQRS termination procedure 1005 in which one or more termination criteria are monitored, such as the Invocation_Period tracked by the invocation timer 350 and the Total_Data_Amount tracked by the traffic monitor 355 as initialized by the PQRS invocation processor 325 during the PQRS invocation registration procedure 730 of FIG. 7.

When one or more of the termination criteria are met, the PQRS termination processor 345 in the NCI 135 sends a PQRS_TERMINATE message 1010 via the NCE 140 to the ENE 125. In response to the PQRS_TERMINATE message 1010, the PQRS marking table processor 625 in the ENE 125 performs a PQRS marking entry clearing procedure 925 to clear any entries in the PQRS marking table 155 corresponding to the QoS priority reassignment that has been terminated.

Similarly, the NCI 135 sends a PQRS_TERMINATE message 1020 to the INE 115. In response to the PQRS_TERMINATE message 1020, the PQRS marking table processor 425 in the INE 115 performs a PQRS marking entry clearing procedure 1025 to clear any entries in the PQRS marking table 150 corresponding to the QoS priority reassignment that has been terminated.

Subsequently, network traffic 1030 continues to be exchanged between the PQRI device 105 and the PQRE device 110 in the service provider's communication network 100 and, thus, any application or service of the PQRI being accessed by the PQRE via the PQRE device 110 need not be terminated. However, the network traffic 1030 will no longer be marked with the temporary reassigned (e.g., upgraded or promoted) QoS priority. The example message sequence diagram 1000 of FIG. 10 then ends.

Flowcharts representative of example machine readable instructions that may be executed to implement the example communication networks 100 and/or 200, the example PQRI device 105, the example PQRE device 110, the example INE 115, the example network 120, the example ENE 125, the example data traffic path 130, the example NCI 135, the example NCE 140, the example PQRS control path 145, the example PQRS marking tables 150 and 155, the example PQRI device 205, the example PQRS server 210, the example data traffic path 215, the example network interface 305, the example PQRS invocation processor 325, the example invocation counter 330, the example PQRS error processor 335, the example PQRS authentication processor 340, the example PQRS termination processor 345, the example invocation timer 350, the example traffic monitor 355, the example network interface 405, the example PQRS marking table 150, the example PQRS marking table processor 425, the example data packet marker 430, the example network interface 505, the example PQRS invocation processor 520, the example PQRS authorization processor 525, the example ENE information processor 530, the example PQRS termination processor 535, the example network interface 605, the example PQRS marking table 155, the example PQRS marking table processor 625 and/or the example data packet marker 630 are shown in FIGS. 11A-B through 16.

In these examples, the machine readable instructions represented by each flowchart may comprise one or more programs for execution by: (a) a processor, such as the processor 1712 shown in the example computer 1700 discussed below in connection with FIG. 17, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1712, but the entire program or programs and/or portions thereof could alternatively be executed by a device other than the processor 1712 and/or embodied in firmware or dedicated hardware (e.g., implemented by an ASIC, a PLD, a FPLD, discrete logic, etc.). For example, any or all of the example communication networks 100 and/or 200, the example PQRI device 105, the example PQRE device 110, the example INE 115, the example network 120, the example ENE 125, the example data traffic path 130, the example NCI 135, the example NCE 140, the example PQRS control path 145, the example PQRS marking tables 150 and 155, the example PQRI device 205, the example PQRS server 210, the example data traffic path 215, the example network interface 305, the example PQRS invocation processor 325, the example invocation counter 330, the example PQRS error processor 335, the example PQRS authentication processor 340, the example PQRS termination processor 345, the example invocation timer 350, the example traffic monitor 355, the example network interface 405, the example PQRS marking table 150, the example PQRS marking table processor 425, the example data packet marker 430, the example network interface 505, the example PQRS invocation processor 520, the example PQRS authorization processor 525, the example ENE information processor 530, the example PQRS termination processor 535, the example network interface 605, the example PQRS marking table 155, the example PQRS marking table processor 625 could be implemented by any combination of software, hardware, and/or firmware. Also, some or all of the machine readable instructions represented by the flowchart of FIGS. 11A-B through 16 may be implemented manually.

Further, although the example machine readable instructions are described with reference to the flowcharts illustrated in FIGS. 11A-B through 16, many other techniques for implementing the example methods and apparatus described herein may alternatively be used. For example, with reference to the flowcharts illustrated in FIGS. 11A-B through 16, the order of execution of the blocks may be changed, and/or some of the blocks described may be changed, eliminated, combined and/or subdivided into multiple blocks.

Example machine readable instructions 1100 that may be executed to implement the NCI 135 of FIG. 3 are represented by the flowchart shown in FIGS. 11A-B. The example machine readable instructions 1100 may be executed as a background process, based on an occurrence of a certain event (e.g., such as receipt of a PQRS_INVITE message 705), etc., or any combination thereof. With reference to FIGS. 1-3 and 7-10, the machine readable instructions 1100 begin execution at block 1105 of FIG. 11A at which the NCI 135 idles or performs other non-PQRS processing until the NCI 135 receives a PQRS_INVITE message 705 sent by the PQRI device 105 or 205. Control then proceeds to block 1110 at which the PQRS authentication processor 335 in the NCI 135 determines whether the PQRI associated with the PQRS_INVITE message 705 received at block 1105 is authorized (e.g., based on its PQRS subscription) to temporarily reassign the QoS priority associated with the PQRE device 110 identified by the PQRE_ID parameter included in the received PQRS_INVITE message 705.

If PQRI authentication is not successful (block 1115), control proceeds to block 1120 at which the PQRS error processor 335 in the NCI 135 generates an invocation error message having a parameter value indicating that an authentication failure has occurred. Control then proceeds to block 1125 at which the PQRS error processor 335 causes a PQRI_REASON message 805 based on the invocation error message generated at bock 1120 to be returned to the PQRI device 105 or 205 that sent the PQRS_INVITE message 705 received at block 1105. Control then returns to block 1105 at which the NCI 135 idles or performs other non-PQRS processing until the NCI 135 receives another PQRS_INVITE message 705.

However, if authorization is successful (block 1115), control proceeds to block 1130 at which the PQRS invocation processor 325 in the NCI 135 evaluates one or more invocation criteria (or invocation rules) to determine whether to invoke the temporary QoS priority reassignment initiated by receipt of the PQRS_INVITE message 705 at block 1105. For example, at block 1130 the PQRS invocation processor 325 evaluates whether an invocation frequency limiting the total number of temporary QoS priority reassignments allowed to be performed during a given time period has been exceeded, and/or whether a concurrent invocation limit limiting a total number of temporary QoS priority reassignments allowed to be active at any given time has been exceeded. If evaluation of the invocation criteria is unsuccessful (block 1135), control proceeds to block 1120 at which the PQRS error processor 335 in the NCI 135 generates an invocation error message having a parameter value indicating which of the invocation criteria was not met. Control then proceeds to block 1125 at which the PQRS error processor 335 causes a PQRI_REASON message 805 based on the invocation error message generated at bock 1120 to be returned to the PQRI device 105 or 205 that sent the PQRS_INVITE message 705 received at block 1105. Control then returns to block 1105 at which the NCI 135 idles or performs other non-PQRS processing until the NCI 135 receives another PQRS_INVITE message 705.

If, however, evaluation of the invocation criteria is successful (block 1135), control proceeds to block 1140 at which the NCI 135 sends a PQRI_ACK message 715 to the INE 115 serving the PQRI 105 or 205 responsible for the PQRS_INVITE message 705 received at block 1105. Control then proceeds to block 1145 at which the NCI 135 registers the temporary QoS priority reassignment to be performed. For example, at block 1145 the PQRS invocation processor 325 in the NCI 135 initializes the invocation timer 350 with the Invocation_Period parameter value included in the PQRS_INVITE message 705 received at block 1105. Additionally or alternatively, the PQRS invocation processor 325 initializes the traffic monitor 355 with the Total_Data_Amount parameter value included in the received PQRS_INVITE message 705. Control then proceeds to block 1150 at which the NCI 135 sends a PQRS_INVITE message 735 to the NCE 140 serving the PQRE device 110 corresponding to the PQRE_ID parameter value contained in the PQRS_INVITE message 705 received at block 1105. The PQRS_INVITE message 735 also contains the PQRE_ID and App_Type parameters provided in the received PQRS_INVITE message 705.

Next, control proceeds to block 1155 of FIG. 11B at which the PQRS termination processor 345 in the NCI 135 evaluates one or more termination criteria to determine whether to terminate the temporary QoS priority reassignment initiated by the received PQRS_INVITE message 705. For example, at block 1155 the PQRS termination processor 345 monitors an invocation period specified by the Invocation_Period parameter included in the received PQRS_INVITE message 705 and tracked by the invocation timer 350 included in the NCI 135. Additionally or alternatively, at block 1155 the PQRS termination processor 345 monitors a total amount of data allowed to be exchanged during the invocation period, with the total amount of data being specified by the Total_Data_Amount parameter included in the received PQRS_INVITE message 705 and tracked by the traffic monitor 355 included in the NCI 135.

If the PQRS termination processor 345 determines that the invocation period has expired (block 1160) or the total amount of permissible traffic at the reassigned QoS level has been exceeded (block 1165), or both, control proceeds to block 1170 at which the PQRS termination processor 345 causes a PQRS_TERMINATE message 1010 to be sent to the ENE 125 serving the PQRE device 110 identified in the received PQRS_INVITE message 705 and whose QoS priority was temporary reassigned. However, if neither the invocation period has expired (block 1160) nor the total amount of traffic has been exceeded (block 1165), control proceeds to block 1175 at which the NCI 135 determines whether a PQRE_REJECT message 905 was received indicating that authorization of the QoS priority reassignment failed. If the PQRS_REJECT 905 message has not been received (block 1175), control returns to block 1155 and blocks subsequent thereto at which the termination processor 345 in the NCI 135 continues to evaluate the one or more termination criteria.

If, however, the PQRS_REJECT 905 message has been received (block 1175) or the PQRS_TERMINATE message 1010 has been sent at block 1170, control proceeds to block 1180 at which the PQRS termination processor 345 performs a PQRS termination procedure to clear/reset any data or processing associated with the PQRS invocation being terminated, and to cause a PQRS_TERMINATE message 1020 to be sent to the PQRI device 105 or 205 responsible for sending the PQRS_INVITE message 705. For example, at block 1180 the PQRS termination processor 345 decrements the invocation counter 330 and resets the invocation timer 350 and the traffic monitor 355 in the NCI 135 to terminate PQRS invocation. Control then returns to block 1105 of FIG. 11A at which the NCI 135 idles or performs other non-PQRS processing until the NCI 135 receives another PQRS_INVITE message 705.

Example machine readable instructions 1200 that may be executed to manage the PQRS marking table 150 in the INE 115 of FIG. 4 are represented by the flowchart shown in FIG. 12. The example machine readable instructions 1200 may be executed as a background process, based on an occurrence of a certain event (e.g., such as receipt of a PQRS_ACK message 715, a PQRS_CLEAR message 920 or a PQRS_CLEAR message 1020), etc., or any combination thereof. With reference to FIGS. 1-2, 4 and 7-10, the machine readable instructions 1200 begin execution at block 1205 of FIG. 12 at which the INE 115 idles or performs other non-PQRS processing until the INE 115 receives a PQRS_ACK message 715 from the NCI 135. As described above, the PQRS_ACK message 715 received at block 1205 contains PQRE_ID and App_Type parameters indicating, respectively, which PQRE device 110 and which type of network traffic associated with the PQRE device 110 is to have its QoS priority temporarily reassigned (e.g., upgraded or promoted).

When the PQRS_ACK message 715 is received, control proceeds to block 1210 at which the PQRS marking table processor 425 in the INE 115 creates an entry in its PQRS marking table 150 to store each reassigned (e.g., upgraded or promoted) QoS priority value to be used to mark network traffic identified by the PQRS_ACK message 715 received at block 1205. For example, at block 1210 an entry in the PQRS marking table 150 is created that is indexed by at least the PQRE device 110 represented by the PQRE_ID parameter and the traffic type represented by the App_Type parameter.

Next, after the table entry is created at block 1210, control proceeds to block 1215 at which the INE 115 monitors the state of the PQRS invocation and, in particular, for receipt of a PQRS_CLEAR message 920 or a PQRS_CLEAR message 1020 indicating that the PQRS invocation corresponding to the table entry created at block 1210 is to be terminated. If a PQRS_CLEAR message 920 or 1020 is received (block 1220), control proceeds to block 1225 at which the PQRS marking table processor 425 clears any entries in the PQRS marking table 150 created at block 1210. Control then returns to block 1205 at which the INE 115 idles or performs other non-PQRS processing until another PQRS_ACK message 715 is received from the NCI 135.

Example machine readable instructions 1300 that may be executed to implement the NCE 140 of FIG. 5 are represented by the flowchart shown in FIG. 13. The example machine readable instructions 1300 may be executed as a background process, based on an occurrence of a certain event (e.g., such as receipt of a PQRS_INVITE message 735), etc., or any combination thereof. With reference to FIGS. 1-2, 5 and 7-10, the machine readable instructions 1300 begin execution at block 1305 of FIG. 13 at which the NCE 140 idles or performs other non-PQRS processing until the NCE 140 receives a PQRS_INVITE message 735 sent from the NCI 135 serving the PQRI 105 or 205 responsible for the current PQRS invocation. Control then proceeds to block 1310 at which PQRS authorization processor 525 in the NCE 140 evaluates one or more authorization criteria to determine whether to allow invocation of the temporary QoS priority reassignment for the PQRE device 110 identified by the PQRE_ID parameter contained in the received PQRS_INVITE message 735. For example, at block 1310 the PQRS authorization processor 525 evaluates a QoS improvement requirement requiring that an upgraded or promoted QoS priority resulting from the temporary QoS priority reassignment is an improvement over an existing QoS priority for the affected network traffic of the PQRE device 110. Additionally or alternatively, at block 1310 the PQRS authorization processor 525 evaluates a subscription rule requirement as described above that a temporary QoS priority reassignment cannot be prohibited by any rule governing access to the communication network 100 or 200 by the PQRE device 110.

If authorization is not successful (block 1315), control proceeds to block 1320 at which the PQRS authorization processor 525 in the NCE 140 generates an error code having a value indicating that an authorization failure has occurred. Control then proceeds to block 1325 at which the PQRS authorization processor 525 causes a PQRE_REJECT message 905 based on the authentication error code generated at bock 1320 to be returned to the NCI 135 that sent the PQRS_INVITE message 735 received at block 1305. Control then returns to block 1305 at which the NCE 140 idles or performs other non-PQRS processing until the NCE 140 receives another PQRS_INVITE message 735 sent by the NCI 135.

However, if authentication is successful (block 1315), control proceeds to block 1330 at which the ENE information processor 530 in the NCE 140 process the parameters contained in the received PQRS_INVITE message 735 (e.g., such as the PQRE_ID parameter) to determine identification information, such as network routing information, destination IP addresses, etc., for the PQRE device 110 whose QoS priority is to be temporarily reassigned, and for the ENE 125 serving the identified PQRE device 110.

Control then proceeds to block 1335 at which the NCE 140 sends a PQRE_ACK message 735 to the NCI 135 serving the PQRI 105 or 205 responsible for the PQRS_INVITE message 735 received at block 1305. Control then proceeds to block 1340 at which the NCE 140 sends a PQRS_INVITE message 745 to the ENE 125 identified at block 1330 as serving the PQRE device 110. The PQRS_INVITE message 745 sent at block 1340 also contains the PQRE_ID and App_Type parameters provided in the PQRS_INVITE message 735 received at block 1305.

Next, control proceeds to block 1345 at which the PQRS termination processor 535 in the NCE 140 perform a termination monitoring procedure and, in particular, monitors for receipt of a PQRS_TERMINATE message 1010 from the NCI 135 serving the PQRI device 105 or 205 responsible for the current PQRS invocation. When a PQRS_TERMINATE message 1010 is received (block 1350), control proceeds to block 1355 at which the PQRS termination processor 535 causes the PQRS_TERMINATE message 1010 to be forwarded to the ENE 125 identified at block 1330 as serving the PQRE device 110 whose QoS priority was temporarily reassigned. Control then returns to block 1305 at which the NCE 140 idles or performs other non-PQRS processing until the NCE 140 receives another PQRS_INVITE message 735 from the NCI 135.

Example machine readable instructions 1400 that may be executed to manage the PQRS marking table 155 in the ENE 125 of FIG. 6 are represented by the flowchart shown in FIG. 14. The example machine readable instructions 1400 may be executed as a background process, based on an occurrence of a certain event (e.g., such as receipt of a PQRS_INVITE message 745 or a PQRS_TERMINATE message 1010), etc., or any combination thereof. With reference to FIGS. 1-2, and 6-10, the machine readable instructions 1400 begin execution at block 1405 of FIG. 14 at which the ENE 125 idles or performs other non-PQRS processing until the ENE 125 receives a PQRS_INVITE message 735 from the NCI 135 serving the PQRI 105 or 205 responsible for the associated PQRS invocation. As described above, the PQRS_INVITE message 735 received at block 1405 contains PQRE_ID and App_Type parameters indicating, respectively, which PQRE device 110 and which type of network traffic associated with the PQRE device 110 is to have its QoS priority temporarily reassigned (e.g., upgraded or promoted).

When the PQRS_INVITE message 735 is received, control proceeds to block 1410 at which the PQRS marking table processor 625 in the ENE 125 creates an entry in its PQRS marking table 150 to store each reassigned (e.g., upgraded or promoted) QoS priority value to be used to mark network traffic identified by the PQRS_INVITE message 735 received at block 1405. For example, at block 1410 an entry in the PQRS marking table 155 is created that is indexed by at least the PQRI device 105 that is responsible for (e.g., the source of) the PQRS_INVITE message 735 or the PQRS server 210 identified in the PQRS_INVITE message 735, and the traffic type represented by the App_Type parameter.

Next, after the table entry is created at block 1410, control proceeds to block 1415 at which the ENE 125 monitors the state of the PQRS invocation and, in particular, for receipt of a PQRS_TERMINATE message 1010 indicating that the PQRS invocation corresponding to the table entry created at block 1410 is to be terminated. If the PQRS_TERMINATE message 1010 is received (block 1420), control proceeds to block 1425 at which the PQRS marking table processor 625 clears any entries in the PQRS marking table 155 created at block 1410. Control then returns to block 1405 at which the ENE 125 idles or performs other non-PQRS processing until another PQRS_INVITE message 735 is received from the NCI 135.

Example machine readable instructions 1500 that may be executed to implement data marking in the INE 115 of FIG. 4 are represented by the flowchart shown in FIG. 15. The example machine readable instructions 1500 may be executed as a background process, based on an occurrence of a certain event (e.g., such as receipt of a data packet from the PQRI device 105 or PQRS server 210), etc., or any combination thereof. With reference to FIGS. 1-2 and 4, the machine readable instructions 1500 begin execution at block 1505 of FIG. 15 at which the INE 115 idles or performs other non-PQRS processing until the INE 115 receives a network traffic data packet from the PQRI device 105 or PQRS server 210 served by the INE 115.

When such a data packet is received, control proceeds to block 1510 at which the INE 115 determines whether the destination of the received data packet corresponds to a PQRE device 110 subject to a PQRS invocation (or, in other words, whose QoS priority has been temporarily reassigned). If the destination of the received data packet is such a PQRE device 110 (block 1510), control proceeds to block 1515 at which the data packet marker 430 in the INE 115 retrieves the appropriate reassigned (e.g., upgraded or promoted) QoS priority from an entry in the PQRS marking table 150 indexed by: (1) the particular PQRI device 105 or PQRS server 210 from which the data packet was received, (2) the particular PQRE device 110 that is the destination of the data packet, and/or (3) the application (or service) type of the data packet being exchanged. Next, control proceeds to block 1520 at which the data packet marker 430 marks the received data packet with the QoS priority retrieved from the PQRS marking table 150 at block 1515.

Then, after the received data packet is marked at block 1520, or if the destination of the packet is not a PQRE device 110 subject to a PQRS invocation (block 1510), control proceeds to block 1525 at which the INE 115 sends the network traffic data packet on to its destination (e.g., the PQRE device 110). Control then returns to block 1505 at which the INE 115 idles or performs other non-PQRS processing until the INE 115 receives another network traffic data packet from the PQRI device 105 or PQRS server 210 served by the INE 115.

Example machine readable instructions 1600 that may be executed to implement data marking in the ENE 125 of FIG. 6 are represented by the flowchart shown in FIG. 16. The example machine readable instructions 1600 may be executed as a background process, based on an occurrence of a certain event (e.g., such as receipt of a data packet from the PQRE device 110), etc., or any combination thereof. With reference to FIGS. 1-2 and 6, the machine readable instructions 1600 begin execution at block 1605 of FIG. 16 at which the ENE 125 idles or performs other non-PQRS processing until the ENE 125 receives a network traffic data packet from the PQRE device 110 served by the ENE 125.

When such a data packet is received, control proceeds to block 1610 at which the ENE 125 determines whether the received data packet is subject to a PQRS invocation (or, in other words, has a QoS priority that is to be temporarily reassigned). For example, at block 1610 the ENE 125 determines whether the destination of the received data packet is a PQRI device 105 or PQRS server 205 associated with a PQRI that has used the PQRS to perform a temporary QoS priority reassignment of network traffic exchanged with the PQRE device 110 providing the received data packet. If the received data packet subject to a PQRS invocation (block 1610), control proceeds to block 1615 at which the data packet marker 630 in the ENE 125 retrieves the appropriate reassigned (e.g., upgraded or promoted) QoS priority from an entry in the PQRS marking table 155 indexed by: (1) the particular PQRE device 110 from which the data packet was received, (2) the particular PQRI device 105 or PQRS server 210 that is the destination of the data packet, and/or (3) the application (or service) type of the data packet being exchanged. Next, control proceeds to block 1620 at which the data packet marker 630 marks the received data packet with the QoS priority retrieved from the PQRS marking table 155 at block 1615.

Then, after the received data packet is marked at block 1620, or if the received data packet is not subject to a PQRS invocation (block 1610), control proceeds to block 1625 at which the ENE 125 sends the network traffic data packet on to its destination (e.g., the PQRI device 105 or the PQRS server 210). Control then returns to block 1605 at which the ENE 125 idles or performs other non-PQRS processing until the ENE 125 receives another network traffic data packet from the PQRE device 110 served by the ENE 125.

Figure 17:
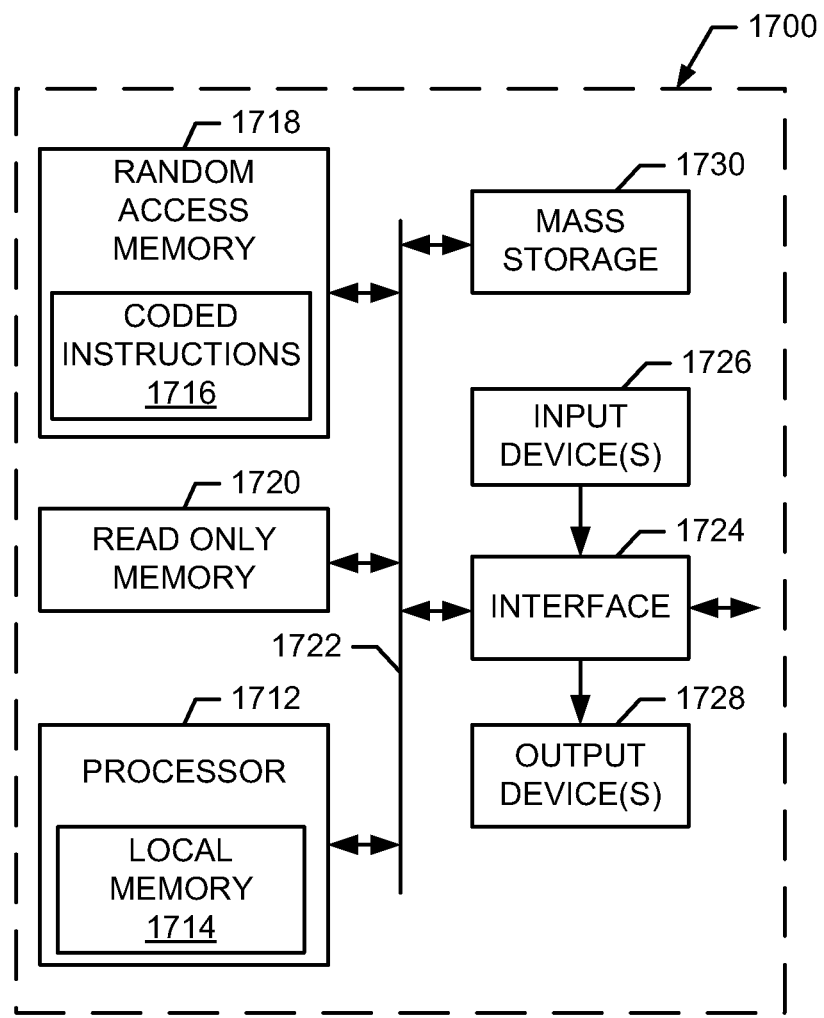
FIG. 17 is a block diagram of an example processor system that may execute the example machine readable instructions of FIGS. 11A-B, 12-15 and/or 16 to implement the first and/or second example communication networks of FIGS. 1-2, the first example network control element of FIG. 3, the first example network access element of FIG. 4, the second example network control element of FIG. 5 and/or the second example network access element of FIG. 6.

FIG. 17 is a block diagram of an example computer 1700 capable of implementing the apparatus and methods disclosed herein. The computer 1700 can be, for example, a server, a personal computer, a personal digital assistant (PDA), an Internet appliance, a DVD player, a CD player, a digital video recorder, a personal video recorder, a set top box, or any other type of computing device.

The system 1700 of the instant example includes a processor 1712 such as a general purpose programmable processor. The processor 1712 includes a local memory 1714, and executes coded instructions 1716 present in the local memory 1714 and/or in another memory device. The processor 1712 may execute, among other things, the machine readable instructions represented in FIGS. 11A-B through 16. The processor 1712 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1712 is in communication with a main memory including a volatile memory 1718 and a non-volatile memory 1720 via a bus 1722. The volatile memory 1718 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1720 may be implemented by flash memory and/or any other desired type of memory device. Access to the main memory 1718, 1720 is typically controlled by a memory controller (not shown).

The computer 1700 also includes an interface circuit 1724. The interface circuit 1724 may be implemented by any type of interface standard, such as an Ethernet interface, a universal serial bus (USB), and/or a third generation input/output (3GIO) interface.

One or more input devices 1726 are connected to the interface circuit 1724. The input device(s) 1726 permit a user to enter data and commands into the processor 1712. The input device(s) can be implemented by, for example, a keyboard, a mouse, a touchscreen, a track-pad, a trackball, an isopoint and/or a voice recognition system.

One or more output devices 1728 are also connected to the interface circuit 1724. The output devices 1728 can be implemented, for example, by display devices (e.g., a liquid crystal display, a cathode ray tube display (CRT)), by a printer and/or by speakers. The interface circuit 1724, thus, typically includes a graphics driver card.

The interface circuit 1724 also includes a communication device such as a modem or network interface card to facilitate exchange of data with external computers via a network (e.g., an Ethernet connection, a digital subscriber line (DSL), a telephone line, coaxial cable, a cellular telephone system, etc.). As such, the interface circuit 1724 may implement the network interfaces 305, 405, 505 and/or 605.

The computer 1700 also includes one or more mass storage devices 1730 for storing software and data. Examples of such mass storage devices 1730 include floppy disk drives, hard drive disks, compact disk drives and digital versatile disk (DVD) drives. The mass storage device 1730 may implement the marking tables 150 and/or 155. Alternatively, the volatile memory 1718 may implement the marking tables 150 and/or 155.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or tangible distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to reassign quality of service priorities in a communication network, the method comprising:

processing, with a processor, a first message received from a device associated with a first user of the communication network, the first message being associated with initiation of a temporary quality of service priority reassignment to reassign a quality of service priority associated with a second user of the communication network, the temporary quality of service priority reassignment to affect network traffic between a first network element associated with the first user and a second network element associated with the second user, the first user being different from a service provider providing the communication network to the first and second users; and evaluating, with the processor, a concurrent invocation limit to determine whether to allow the temporary quality of service priority reassignment associated with the first message to be performed, the concurrent invocation limit to cause a number of temporary quality of service priority reassignments initiated by the first user to reassign quality of service priorities for a plurality of other users including the second user not to exceed a total number of temporary quality of service priority reassignments permitted to be active concurrently for the first user.

2. The method as defined in claim 1 further comprising:
authenticating whether the first user is authorized to temporarily reassign the quality of service priority associated with the second user.

3. The method as defined in claim 2 further comprising:
invoking the temporary quality of service priority reassignment when the concurrent invocation limit is satisfied;
monitoring for occurrence of a termination criterion; and
terminating the temporary quality of service priority reassignment upon occurrence of the termination criterion.

4. The method as defined in claim 3 wherein invoking the temporary quality of service priority reassignment comprises:
sending an acknowledgment message to the first network element; and
sending an invite message to a proxy associated with the second network element.

5. The method as defined in claim 3 wherein the termination criterion comprises:
an invocation period after which the temporary quality of service priority reassignment is to be terminated.

6. The method as defined in claim 1 wherein the method further comprises:
evaluating an invocation frequency to determine whether to allow the temporary quality of service priority reassignment to be performed, the invocation frequency limiting a total number of temporary quality of service priority reassignments permitted to be initiated by the first user during a time period.

7. The method as defined in claim 1 further comprising:
receiving an invite message indicating that the temporary quality of service priority reassignment is to be performed;
evaluating an authorization criterion to determine whether to authorize the temporary quality of service priority reassignment to be performed; and
when the authorization criterion is satisfied, forwarding the invite message to the second network element.

8. The method as defined in claim 7 wherein the authorization criterion comprises:
a requirement that a second quality of service priority resulting from the temporary quality of service priority reassignment is an improvement over an existing first quality of service priority associated with the second user.

9. The method as defined in claim 1 further comprising terminating the temporary quality of service priority reassignment by:
monitoring for receipt of a termination message based on occurrence of a termination criterion; and
forwarding the termination message upon receipt to the second network element.

10. The method as defined in claim 1 further comprising:
creating an entry in a marking table to store a quality of service priority value for marking the network traffic between the first network element and the second network element;
retrieving the quality of service priority value from the marking table; and
marking the network traffic between the first network element and the second network element with the quality of service priority value.

11. The method as defined in claim 10 further comprising terminating the temporary quality of service priority reassignment by:
clearing the entry in the marking table in response to receiving a message based on occurrence of a termination criterion.

12. A tangible machine readable storage device comprising machine readable instructions which, when executed by a machine comprising a processor, cause the machine to perform operations comprising:
processing a first message received from a device associated with a first user of a communication network, the first message being associated with initiation of a temporary quality of service priority reassignment to reassign a quality of service priority associated with a second user of the communication network, the temporary quality of service priority reassignment to affect network traffic between a first network element associated with the first user and a second network element associated with the second user, the first user being different from a service provider providing the communication network to the first and second users; and
evaluating a concurrent invocation limit to determine whether to allow the temporary quality of service priority reassignment associated with the first message to be performed, the concurrent invocation limit to cause a number of temporary quality of service priority reassignments initiated by the first user to reassign quality of service priorities for a plurality of other users including the second user not to exceed a total number of temporary quality of service priority reassignments permitted to be active concurrently for the first user.

13. The tangible storage device as defined in claim 12 wherein the operations further comprise:
invoking the temporary quality of service priority reassignment when the concurrent invocation limit is satisfied;
monitoring for occurrence of a termination criterion; and
terminating the temporary quality of service priority reassignment upon occurrence of the termination criterion.

14. The tangible storage device as defined in claim 12 wherein the operations further comprise:
receiving an invite message indicating that the temporary quality of service priority reassignment is to be performed;
evaluating an authorization criterion to determine whether to authorize the temporary quality of service priority reassignment to be performed;
when the authorization criterion is satisfied, forwarding the invite message to the second network element;
monitoring for receipt of a termination message based on occurrence of a termination criterion; and
forwarding the termination message upon receipt to the second network element.

15. The tangible storage device as defined in claim 12 wherein the operations further comprise:
creating an entry in a marking table to store a quality of service priority value for marking the network traffic between the first network element to the second network element;
retrieving the quality of service priority value from the marking table;
marking the network traffic between the first network element to the second network element with the quality of service priority value; and
clearing the entry in the marking table in response to receiving a message based on occurrence of a termination criterion.

16. The tangible storage device as defined in claim 12 wherein the first user is authorized by the service provider to temporarily reassign the quality of service priority associated with the second user when the first user subscribes to a quality of service priority reassignment service class offered by the service provider, the quality of service priority reassignment service class characterized by a termination criterion and an invocation criterion.

17. A system to reassign quality of service priorities in a communication network, the system comprising:
a memory including first stored instructions; and
a first network control element associated with a first user of the communication network, the first network control element comprising a first processor to execute the first stored instructions to perform first operations comprising:
processing a first message received from a device associated with the first user, the first message being associated with initiation of a temporary quality of service priority reassignment to reassign a quality of service priority associated with a second user of the communication network, the temporary quality of service priority reassignment to affect network traffic between a first network access element associated with the first user and a second network access element associated with the second user, the first user being different from a service provider providing the communication network to the first and second users; and
evaluating a concurrent invocation limit to determine whether to allow the temporary quality of service priority reassignment associated with the first message to be performed, the concurrent invocation limit to cause a number of temporary quality of service priority reassignments initiated by the first user to reassign quality of service priorities for a plurality of other users including the second user not to exceed a total number of temporary quality of service priority reassignments allowed to be active concurrently for the first user.

18. The system as defined in claim 17 wherein the first operations performed by the first network control element further comprise:
when the concurrent invocation limit is satisfied, sending the second message to the second network control element to indicate that the temporary quality of service priority reassignment is to be invoked.

19. The system as defined in claim 17 further comprising:
a second network control element associated with the second user, the second network control element comprising a second processor to execute second instructions to perform second operations comprising determining whether to allow invocation of the temporary quality of service reassignment in response to a second message received from the first network control element indicating that the temporary quality of service reassignment is to be invoked, wherein the first operations performed by the first network control element further comprise:
monitoring a traffic monitor initialized with a total amount of network traffic allowed to be exchanged during an invocation period to determine whether to terminate the temporary quality of service priority reassignment; and
when the first network control element determines that the temporary quality of service priority reassignment is to be terminated, sending a third message to the second network control element indicating that the temporary quality of service priority reassignment is to be terminated.

20. The system as defined in claim 17 further comprising:
a second network control element associated with the second user, the second network control element comprising a second processor to execute second instructions to perform second operations comprising determining whether to allow invocation of the temporary quality of service reassignment in response to a second message received from the first network control element indicating that the temporary quality of service reassignment is to be invoked, wherein the second operations performed by the second network control element further comprise evaluating an authorization criterion to determine whether to allow the temporary quality of service priority reassignment to be performed, the authorization criterion comprising:
a subscription rule requirement that the temporary quality of service priority reassignment is not prohibited by a rule governing access to the communication network by the second user.

21. The system as defined in claim 17 further comprising:
a second network control element associated with the second user, the second network control element comprising a second processor to execute second instructions to perform second operations comprising determining whether to allow invocation of the temporary quality of service reassignment in response to a second message received from the first network control element indicating that the temporary quality of service reassignment is to be invoked, wherein the first operations performed by the first network access element further comprise marking network traffic from the first network access element to the second network access element with an upgraded quality of service priority value upon successful invocation of the temporary quality of service priority reassignment, and the second operations performed by the second network access element further comprise marking network traffic from the second network access element to the first network access element with the upgraded quality of service priority value upon successful invocation of the temporary quality of service priority reassignment.

* * * * *